(12) United States Patent
Okahisa

(10) Patent No.: US 12,044,374 B2
(45) Date of Patent: Jul. 23, 2024

(54) LIGHT SOURCE DEVICE AND LIGHT GUIDE ARRAY UNIT

(71) Applicant: NICHIA CORPORATION, Anan (JP)

(72) Inventor: Tsuyoshi Okahisa, Tokushima (JP)

(73) Assignee: NICHIA CORPORATION, Anan (JP)

( * ) Notice: Subject to any disclaimer, the term of this patent is extended or adjusted under 35 U.S.C. 154(b) by 0 days.

(21) Appl. No.: 18/188,574

(22) Filed: Mar. 23, 2023

(65) Prior Publication Data

US 2023/0228401 A1 Jul. 20, 2023

Related U.S. Application Data

(63) Continuation of application No. PCT/JP2021/035200, filed on Sep. 24, 2021.

(30) Foreign Application Priority Data

| Oct. 2, 2020 | (JP) | 2020-168014 |
| Feb. 2, 2021 | (JP) | 2021-015305 |
| Jun. 9, 2021 | (JP) | 2021-096777 |

(51) Int. Cl.
*F21S 41/265* (2018.01)
*F21L 4/02* (2006.01)
(Continued)

(52) U.S. Cl.
CPC ............. *F21S 41/265* (2018.01); *F21L 4/027* (2013.01); *F21S 41/153* (2018.01);
(Continued)

(58) Field of Classification Search
CPC ...... F21V 5/007; F21V 7/0083; F21V 7/0091; F21Y 2107/10; F21Y 2107/20;
(Continued)

(56) References Cited

U.S. PATENT DOCUMENTS

2007/0223095 A1 9/2007 Brown
2008/0043466 A1 2/2008 Chakmakjian et al.
(Continued)

FOREIGN PATENT DOCUMENTS

| CN | 205877921 U | 1/2017 | |
| EP | 2772680 A1 * | 9/2014 | ................ F21S 8/02 |

(Continued)

OTHER PUBLICATIONS

Machine translation of EP 2772680 A1 retrieved from the FIT database of PE2E search. (Year: 2023).*

(Continued)

*Primary Examiner* — Colin J Cattanach
(74) *Attorney, Agent, or Firm* — Foley & Lardner LLP

(57) ABSTRACT

A light source device includes: a plurality of light source parts configured to emit light, in which each of the light source parts includes a light-emitting element and a light guiding member, the plurality of light source parts are disposed in a circular, planar-shaped placement region and are arranged in (i) a combination of at least a rectangular grid and a triangular grid or (ii) a concentric circular pattern, and the plurality of light source parts are configured to emit the light in a matrix pattern in an irradiated region.

11 Claims, 16 Drawing Sheets

(51) Int. Cl.
  *F21S 41/153* (2018.01)
  *F21V 5/00* (2018.01)
  *F21V 7/00* (2006.01)
  *F21V 7/09* (2006.01)
  *F21Y 105/18* (2016.01)
  *F21Y 115/10* (2016.01)
  *G03B 15/05* (2021.01)
  *G03B 15/06* (2021.01)

(52) U.S. Cl.
  CPC ......... *F21V 7/0075* (2013.01); *F21V 7/0083* (2013.01); *F21V 7/09* (2013.01); *G03B 15/05* (2013.01); *G03B 15/06* (2013.01); *F21V 5/007* (2013.01); *F21V 7/0091* (2013.01); *F21Y 2105/18* (2016.08); *F21Y 2115/10* (2016.08); *G03B 2215/0503* (2013.01); *G03B 2215/0567* (2013.01); *G03B 2215/0582* (2013.01)

(58) Field of Classification Search
  CPC ............ F21Y 2107/30; F21Y 2107/40; F21Y 2107/50; F21Y 2107/60
  See application file for complete search history.

(56) References Cited

U.S. PATENT DOCUMENTS

| | | |
|---|---|---|
| 2009/0244894 A1 | 10/2009 | Zhou et al. |
| 2009/0257040 A1 | 10/2009 | Dinger |
| 2010/0073932 A1 | 3/2010 | Zheng |
| 2010/0296265 A1 | 11/2010 | Kim et al. |
| 2011/0267813 A1* | 11/2011 | Kubota ............... F21V 5/002 362/235 |
| 2012/0147333 A1 | 6/2012 | Jørgensen |
| 2013/0026508 A1 | 1/2013 | Roos |
| 2013/0064531 A1 | 3/2013 | Pillman et al. |
| 2014/0133142 A1 | 5/2014 | Jørgensen |
| 2014/0232996 A1 | 8/2014 | Okamoto et al. |
| 2015/0124458 A1 | 5/2015 | Schadt et al. |
| 2015/0159827 A1 | 6/2015 | Joergensen |
| 2015/0159829 A1 | 6/2015 | Joergensen |
| 2015/0219305 A1 | 8/2015 | Michiels et al. |
| 2016/0069540 A1 | 3/2016 | Kjeldsen et al. |
| 2017/0251201 A1 | 8/2017 | Sissom et al. |
| 2017/0350573 A1* | 12/2017 | Fleszewski ............ F21V 7/041 |
| 2018/0066827 A1 | 3/2018 | Joergensen |
| 2018/0238518 A1* | 8/2018 | Huang ............... F21V 7/041 |
| 2019/0242830 A1 | 8/2019 | Kato et al. |
| 2019/0280174 A1 | 9/2019 | Okahisa et al. |
| 2020/0343410 A1 | 10/2020 | Iguchi |
| 2020/0355493 A1 | 11/2020 | Nakamura et al. |

FOREIGN PATENT DOCUMENTS

| | | | |
|---|---|---|---|
| JP | 2001-272629 A | 10/2001 | |
| JP | 2009-295434 A | 12/2009 | |
| JP | 2010-020995 A | 1/2010 | |
| JP | 2010-500735 A | 1/2010 | |
| JP | 2010-519726 A | 6/2010 | |
| JP | 2010-272527 A | 12/2010 | |
| JP | 2011-222514 A | 11/2011 | |
| JP | 2014-157282 A | 8/2014 | |
| JP | 2014-530376 A | 11/2014 | |
| JP | 2015-149188 A | 8/2015 | |
| JP | 2015-523673 A | 8/2015 | |
| JP | 2015-162424 A | 9/2015 | |
| JP | 2015-167512 A | 9/2015 | |
| JP | 2015-534222 A | 11/2015 | |
| JP | 2017-162772 A | 9/2017 | |
| JP | 2017-224462 A | 12/2017 | |
| JP | 2019-514034 A | 5/2019 | |
| JP | 2019-138893 A | 8/2019 | |
| JP | 2019-160780 A | 9/2019 | |
| JP | 2020-004868 A | 1/2020 | |
| KR | 100959511 B1 * | 5/2010 | ............ F21V 7/0083 |
| KR | 20160114253 A * | 10/2016 | |

OTHER PUBLICATIONS

Machine translation of KR 20160114253 A retrieved from the FIT database of PE2E search. (Year: 2023).*

Machine translation of KR 100959511 B1 retrieved from the FIT database of PE2E search. (Year: 2024).*

International Search Report and Written Opinion of the International Searching Authority with English language translation of the International Search Report issued in the corresponding International Patent Application No. PCT/JP2021/035200, dated Nov. 2, 2021.

Non-Final Office Action in U.S. Appl. No. 18/190,348, dated Sep. 13, 2023.

Final Office Action in U.S. Appl. No. 18/190,348 dated Jan. 3, 2024.

Non-Final Office Action in U.S. Appl. No. 18/190,348 issued Mar. 28, 2024.

* cited by examiner

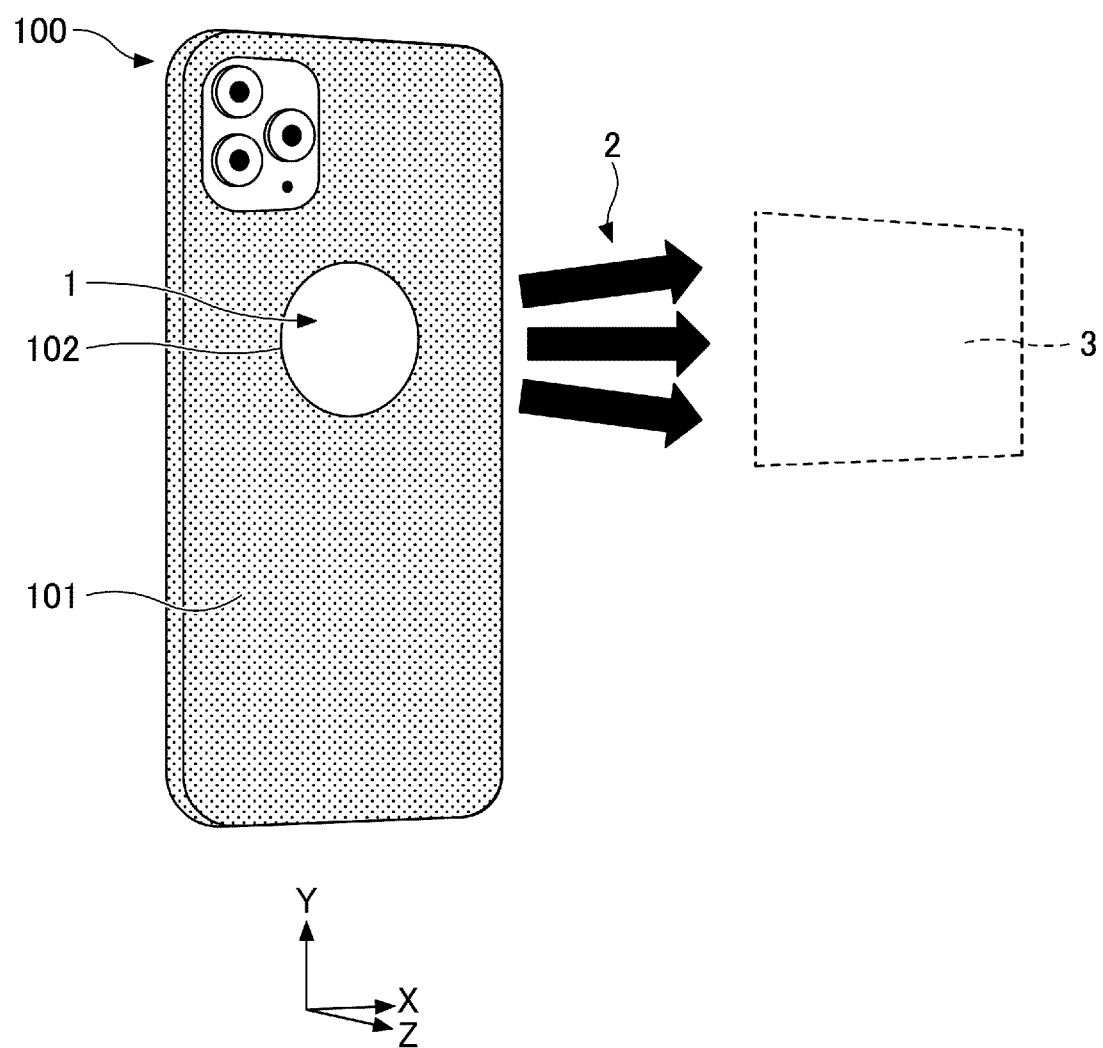

FIG.11

| ITEMS | | LIGHT SOURCE DEVICE 1 | | | LIGHT SOURCE DEVICE 1X |
|---|---|---|---|---|---|
| LIGHT EMISSION PATTERN | | | | | |
| EXPERIMENT DATA | MAXIMUM ILLUMINANCE | 2676 lux | 1250 lux | 454 lux | 1500 lux |
| | ILLUMINANCE UNIFORMITY | 41.5% | — | — | 41.0% |
| | ILLUMINANCE DISTRIBUTION | | | | |

FIG.13A
| No. | 1 | 2 | 3 | 4 | 5 | 6 | 7 |
|---|---|---|---|---|---|---|---|
| LIGHT EMISSION PATTERN | 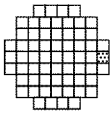 | 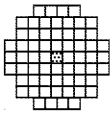 | 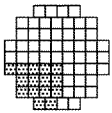 | 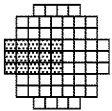 | 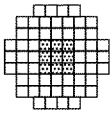 | 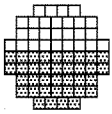 | 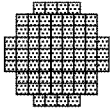 |
| ILLUMINANCE DISTRIBUTION BY LIGHT SOURCE DEVICE 1 | 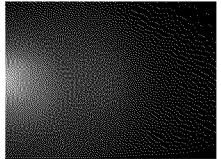 | 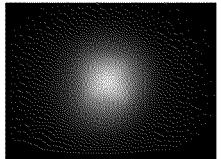 |  | 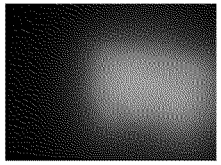 |  | 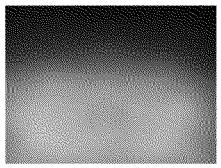 |  |

FIG.13B
| No. | 1 |
|---|---|
| LIGHT EMISSION PATTERN |  |
| ILLUMINATION DISTRIBUTION BY LIGHT SOURCE DEVICE 1X | 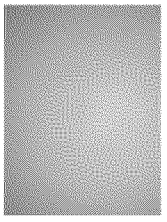 |

LIGHT SOURCE DEVICE AND LIGHT GUIDE ARRAY UNIT

CROSS-REFERENCE TO RELATED APPLICATIONS

This is a bypass continuation of PCT Application No. PCT/JP2021/035200, filed on Sep. 24, 2021, which claims priority to Japanese Patent Application No. 2020-168014, filed Oct. 2, 2020, Japanese Patent Application No. 2021-015305, filed on Feb. 2, 2021, and Japanese Patent Application No. 2021-096777, filed on Jun. 9, 2021. The contents of these applications are incorporated herein by reference in their entireties.

BACKGROUND

Technical Field

The present disclosure relates to a light source device and a light guide array unit.

Background Art

A known light-emitting device includes a plurality of light-emitting diodes arranged in a two-dimensional array at equal intervals in a predetermined planar region and lens caps individually attached to the plurality of light-emitting diodes, wherein a directivity angle of the light emitted from the lens caps narrows as it travels from the center of the planar region to the outer circumference side. In the light-emitting device, the arrangement of the light sources is the same as the arrangement of the light emitted by the light sources (for example, see JP 2015-167512 A).

SUMMARY

Technical Problem

An object of the present disclosure is to provide a light source device and a light guide array unit that can emit light in an arrangement different from an arrangement of light source parts irrespectively of the arrangement of light source parts.

Solution to Problem

A light source device according to an embodiment of the present disclosure includes: a plurality of light source parts configured to emit light, wherein: each of the light source parts comprises a light-emitting element and a light guiding member, the plurality of light source parts are disposed in a circular, planar-shaped placement region, and are arranged in (i) a combination of at least a rectangular grid and a triangular grid or (ii) a concentric circular pattern, and the plurality of light source parts are configured to emit the light in a matrix pattern in an irradiated region.

A light source device according to another embodiment of the present disclosure includes: a plurality of light source parts configured to emit light, wherein: each of the light source parts comprises a light-emitting element and a light guiding member, the plurality of light source parts are configured to emit the light in an array in an irradiated region, and one or more of the plurality of light source parts are arranged in a placement region in a different arrangement from an arrangement of the light in the irradiated region.

A light guide array unit according to an embodiment of the present disclosure includes: a plurality of light guiding members, wherein: each of the plurality of light guiding members is configured to guide light incident from a light-emitting element and cause the guided light to irradiate an irradiated region, the plurality of light guiding members are disposed in a circular, planar-shaped placement region, and are arranged in (i) a combination of at least a rectangular grid and a triangular grid, or (ii) a concentric circular pattern, and the plurality of light guiding members are configured to irradiate the light in a matrix pattern in the irradiated region.

A light guide array unit according to another embodiment of the present disclosure includes: a plurality of light guiding members, wherein: each of the plurality of light guiding members is configured to guide light incident from a light-emitting element and cause the guided light to exit to irradiate an irradiated region, the plurality of light guiding members are configured to irradiate the light in an array in the irradiated region, and one or more of the plurality of light guiding members are arranged in an arrangement different from an arrangement of the light in the irradiated region, in a placement region.

According to an embodiment of the present disclosure, provided is a light source device and a light guide array unit that can emit light in an arrangement different from an arrangement of light source parts irrespectively of an arrangement of light source parts.

BRIEF DESCRIPTION OF THE DRAWINGS

FIG. 1 is a diagram illustrating an example of illumination performed by a light source device according to an embodiment.

FIG. 11 is a diagram for comparing a light source device according to an example and a light source device according to a reference example.

FIG. 13A is a diagram of illuminance distribution of irradiation light from a light source device according to an example.

FIG. 13B is a diagram of illuminance distribution of irradiation light from a light source device according to a reference example.

DETAILED DESCRIPTION

Figure 2A:
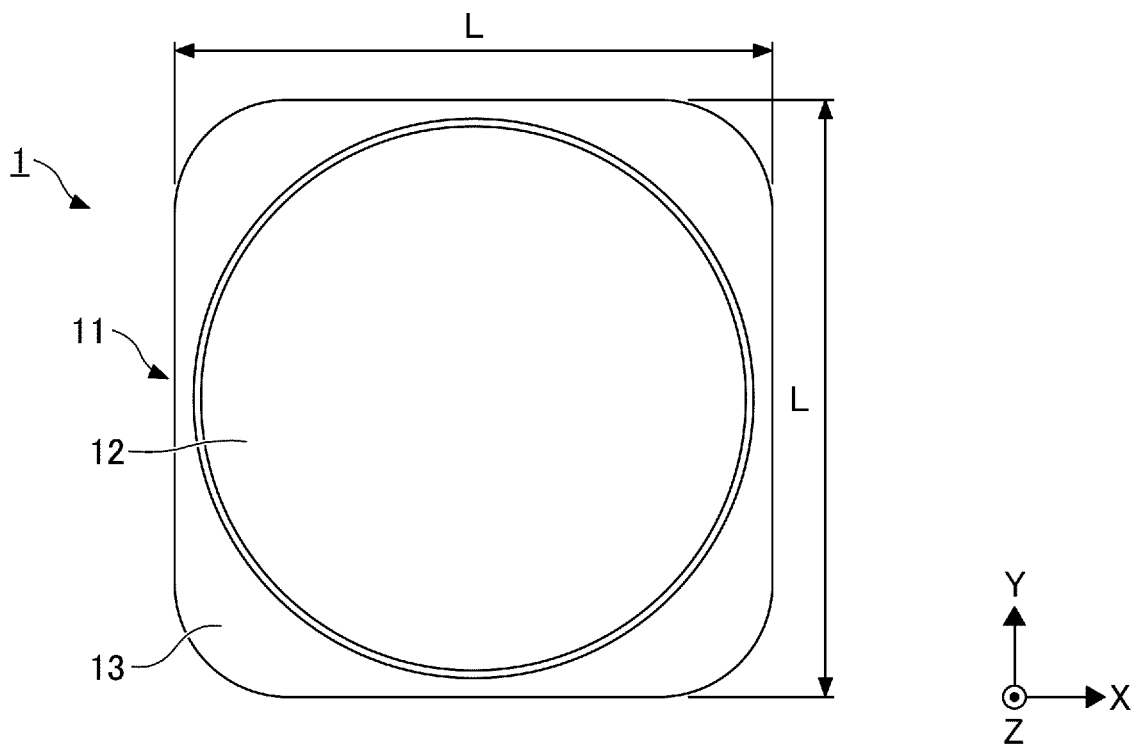
FIG. 2A is a plan view illustrating an example of the appearance of a light source device according to an embodiment.

Hereinafter, embodiments for carrying out the invention will be described with reference to the drawings. Note that hereinafter, parts having the same reference numerals appearing in a plurality of drawings indicate identical or equivalent portions or members.

Further, the embodiments described below exemplify light source devices for embodying the technical concept of the present invention, and the present invention is not limited to the embodiment described below. Unless otherwise specified, the dimensions, materials, shapes, relative arrangements, and the like of constituent elements described below are not intended to limit the scope of the present invention to those alone, but are intended to be illustrative. The size, positional relationship, and the like of the members illustrated in the drawings can be exaggerated in order to clarify explanation.

In the drawings described below, directions may be indicated by an X axis, a Y axis, and a Z axis. An X direction along the X axis indicates a predetermined direction in an array plane in which a plurality of light source parts provided in a light source device according to the embodiment are arrayed, a Y direction along the Y axis indicates a direction orthogonal to the X direction in the array plane, and a Z direction along the Z axis indicates a direction orthogonal to the array plane.

Also, the direction in the X direction in which the arrow faces is referred to as the +X direction and the opposite direction to the +X direction is referred to as the −X direction, the direction in the Y direction in which the arrow faces is referred to as the +Y direction and the opposite direction to the +Y direction is referred to as the −Y direction, and the direction in the Z direction in which the arrow faces is referred to as the +Z direction and the opposite direction to the +Z direction is referred to as the −Z direction. In the embodiment, the plurality of light source parts emit light toward the +Z direction side, for example. However, this does not limit the orientation of the light source device during use, and light source device may be oriented in any appropriate direction.

Hereinafter, an embodiment will be described using a smartphone with a light source device according to the embodiment as an example.

Embodiment

Example of Illumination by Light Source Device 1

First, illumination by the light source device 1 according to the present embodiment will be described with reference to FIG. 1. FIG. 1 is a diagram for describing an example of how illumination is performed by the light source device 1.

As illustrated in FIG. 1, a smartphone 100 includes a back surface panel 101 and the light source device 1. The back surface panel 101 is a plate-like member that constitutes a part of the housing of the smartphone 100 and is provided on the side opposite to the front surface portion where the operation unit of the smartphone 100, such as a touch panel, is provided. A through hole 102 having a substantially circular shape is formed in the back surface panel 101.

The light source device 1 is provided inside the housing of the smartphone 100 in a manner allowing it to emit light through the through hole 102. The light source device 1, for example, is a flashlight used for a portable lighting device such as a flashlight, a lighting device that emits a flash for photography, or the like.

The light source device 1 emits irradiation light 2 in a direction (+Z direction) along the center axis of the through hole 102 and illuminates a target, such as a person or object, located in the irradiation direction. As illustrated in FIG. 1, the light source device 1 is configured to illuminate an irradiated region 3, which is a rectangular region. The irradiated region 3, for example, is a rectangular region with a ratio of the length in the long side direction along the X direction to the length in the short side direction along the Y direction of 4:3.

Note that the irradiated region 3 is not limited to a surface region of a planar-shaped target, such as a wall surface or a screen, and may be a surface region of an uneven target or a region of space where there is no target.

Configuration Example of Light Source Device 1

Figure 2B:
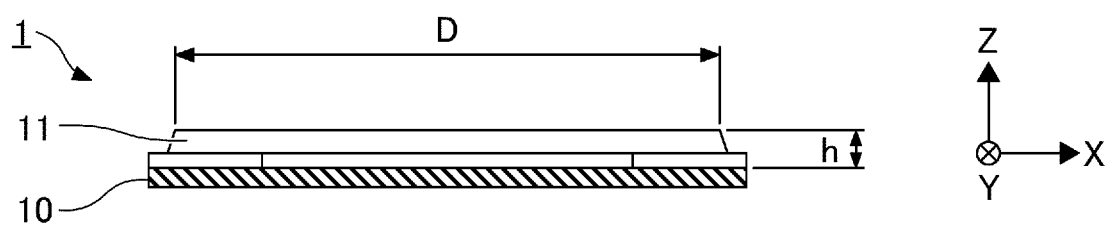
FIG. 2B is a side view illustrating an example of the appearance of a light source device according to an embodiment.

Subsequently, the configuration of the light source device 1 will be described with reference to FIGS. 2A to 8. FIGS. 2A and 2B are diagrams illustrating an example of the appearance of the light source device 1. FIG. 2A is a plan view, and FIG. 2B is a side view.

As illustrated in FIGS. 2A and 2B, the light source device 1 includes a substrate 10 and a light guide array unit 11 provided above a surface of the substrate 10 on the +Z direction side. The substrate 10 is a plate-shaped member having a substantially square shape, and is a substrate provided with wiring to which a light-emitting element, such as a light emitting diode (LED) or a laser diode (LD), and various electrical elements can be mounted. A substrate of various materials such as a metal substrate, a paper phenol substrate, a paper epoxy substrate, or a glass epoxy substrate can be applied to the substrate 10.

The light guide array unit 11 is a member in which a plurality of light guiding members that are integrally formed are arranged in an array. As illustrated in FIG. 2A, the light guide array unit 11 includes a placement region 12 with a circular planar shape, which is substantially circular in a plan view, and a peripheral region 13, which is substantially square-shaped in a plan view, that surrounds the placement region 12. The circular plane of the placement region 12 is parallel with the array plane described above. Furthermore, the external shape of the peripheral region 13 is substantially the same as the external shape of the substrate 10. Thus, in FIG. 2A, the substrate 10 is hidden by the light guide array unit 11.

The +Z direction side of the placement region 12 of the light guide array unit 11 is formed in a planar shape (in other words, with a substantially flat surface). Also, a plurality of light guiding members are formed on the −Z direction side of the placement region 12 of the light guide array unit 11. The surface of the peripheral region 13 on the −Z direction side is in contact with the surface of the substrate 10 on the +Z direction side. The light guide array unit 11 is fixed to the surface of the substrate 10 on the +Z direction side by bonding together the two contacting surfaces via adhesive, for example.

Note that, in FIG. 2A, to facilitate the description of the appearance of the light source device 1, the light guide array unit 11 is illustrated as an opaque member. However, in the light guide array unit 11 according to the present embodiment, at least the placement region 12 is a transparent member. As used herein, the term "transparent" refers to being transmissive of visible light and/or non-visible light. In this example, the light guide array unit 11 is transmissive of visible light.

The light guide array unit 11 can be manufactured by an injection molding process using a polycarbonate resin material, but the manufacturing process is not limited thereto. The light guide array unit 11 can be formed of various types of resin materials such as acrylic resins, a glass material, and the like. Other processing methods such as cutting and the like may also be used. Also, the wavelength of the light transmitted through the light guide array unit 11 can be restricted by forming the light guide array unit 11 using colored resin or providing an optical band-pass filter, for example.

A length L of the light source device 1 is preferably 30 mm or greater and 40 mm or less, and a diameter D of the placement region 12 is preferably 27 mm or greater and 37 mm or less. A height (length in the Z-axis direction) h of the light guide array unit 11 is preferably 2 mm or greater and 3 mm or less. When the light source device 1 is attached to a smartphone, the smartphone user can see the placement region 12 from the outside. The peripheral region 13 is hidden by the back surface panel of the smartphone and cannot be seen by the user.

Figure 3A:
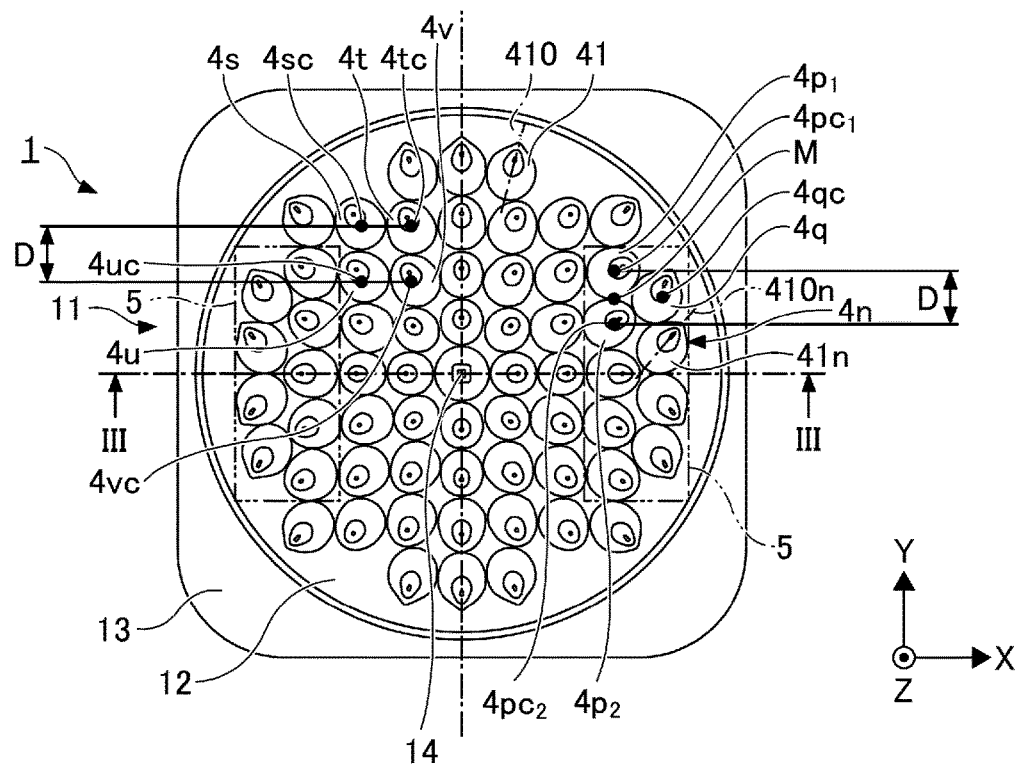
FIG. 3A is a perspective view illustrating an example of the configuration of a light source device according to an embodiment.
Figure 3B:
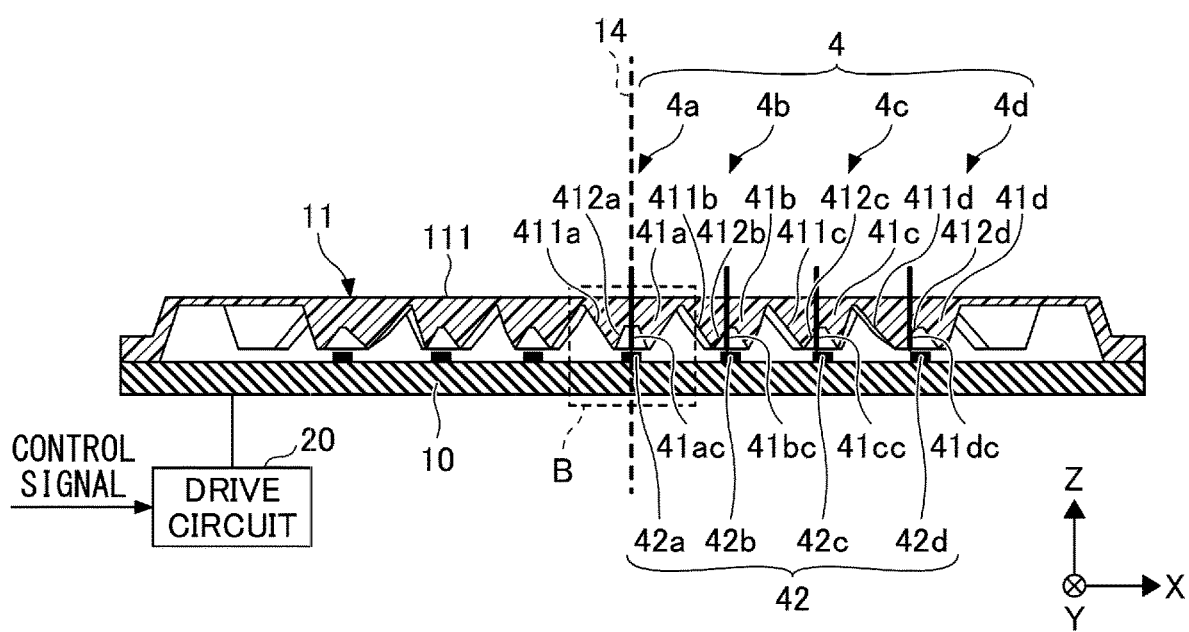
FIG. 3B is an enlarged view of a cross-section taken along in FIG. 3A.

FIGS. 3A and 3B are diagrams for describing an example of the configuration of the light source device 1. FIG. 3A is a perspective view, and FIG. 3B is an enlarged view of a cross-section taken along in FIG. 3A. FIG. 3A illustrates the configuration on the −Z direction side of the placement region 12, with the +Z direction side surface of the placement region 12 of the light guide array unit 11 being illustrated in a see-through manner.

As illustrated in FIG. 3A, a plurality of total internal reflection (TIR) lenses 41 arranged in an array plane are formed on the −Z direction side of the placement region 12. The TIR lens 41 is an example of a light guiding member that includes a total reflection surface 411 that completely reflects light. Specifically, the total reflection surface 411 that completely reflects light is provided inside the TIR lens 41. The light source device 1 includes a total of 63 TIR lenses 41.

Note that the term "TIR lenses 41" refers collectively to a plurality of TIR lenses including TIR lenses 41a, 41b, 41c, 41d, and the like in FIG. 3B. Also, the term "total reflection surfaces 411" refers collectively to a plurality of total reflection surfaces including total reflection surfaces 411a, 411b, 411c, 411d, and the like in FIG. 3B. Note that the TIR lenses 41 are components formed on the back side (−Z direction side) of the placement region 12. However, for ease of viewing, in FIG. 3A, the TIR lenses 41 are indicated with solid lines. This is also the case hereafter for diagrams illustrating the TIR lenses 41 with the placement region 12 being see-through.

As illustrated in FIG. 3B, the total reflection surfaces 411 are each a tapered surface that tapers in the −Z direction. However, the shape of the total reflection surface 411 is not limited to a tapered shape and may be a bowl shape with a curve. Also, the shape does not need to be axisymmetric with respect to an axis parallel with the Z axis. For example, the TIR lens may be formed substantially line-symmetrical with respect to the center line of the TIR lens. Here, the center line of the TIR lens refers to a line passing through substantially the center of the TIR lens in a plane parallel with the array plane. For example, a center line 410 illustrated in FIG. 3A indicates the center line of the TIR lens 41.

Also, as illustrated in FIG. 3B, adjacent TIR lenses 41 of the plurality of TIR lenses 41 are connected on the emitting surface 111 side where light is emitted. Specifically, for example, the TIR lenses 41a, 41b, 41c, and 41d are connected together on the emitting surface 111 side.

The plurality of TIR lenses 41 include those with different shapes. For example, as illustrated in FIG. 3B, the TIR lens 41a has a shape that is substantially axisymmetric with respect to a center axis 41ac of the TIR lens 41a. Specifically, the TIR lens 41a includes a total reflection surface 411a and a truncated cone surface 412a, which is a surface formed in a substantially truncated cone shape. Each of the total reflection surface 411a and the truncated cone surface 412a is formed substantially axisymmetric with respect to the center axis 41ac of the TIR lens 41a. Note that the center axis of the TIR lens refers to an axis substantially parallel with the Z axis that extends through substantially the center of the TIR lens and is a midpoint in the maximum diameter of the TIR lens in a plan view.

The TIR lens 41b is not formed in a shape that is axisymmetric with respect to a center axis 41bc of the TIR lens 41b. Specifically, the TIR lens 41b includes a total reflection surface 411b and a truncated cone surface 412b. Each of the total reflection surface 411b and the truncated cone surface 412b is formed substantially line-symmetrical with respect to a center line (see the center line 410 described above) of the TIR lens 41b, but is not axisymmetric.

In a similar manner, each of the total reflection surface 411c and a truncated cone surface 412c of the TIR lens 41c is formed substantially line-symmetrical with respect to a center line (see the center line 410 described above) of the TIR lens 41c, but is not axisymmetric with respect to a center axis 41cc of the TIR lens 41c. Also, each of the total reflection surface 411d and a truncated cone surface 412d of the TIR lens 41d is formed substantially line-symmetrical with respect to a center line (see the center line 410 described above) of the TIR lens 41d, but is not axisymmetric with respect to a center axis 41dc of the TIR lens 41d. The term "truncated cone surfaces 412" described below refers collectively to the truncated cone surfaces 412a, 412b, 412c, and 412d.

Here, the TIR lens 41a is an example of a first light guiding member, and the TIR lens 41b is an example of a second light guiding member. The shape of the TIR lens 41a and the shape of the TIR lens 41b are different. While the TIR lens 41b is illustrated as an example of the second light guiding member, all of the plurality of TIR lenses not centrally disposed in the placement region 12 correspond to the second light guiding member. In other words, of the plurality of TIR lenses 41, all of the TIR lenses that are not the TIR lens 41a correspond to the second light guiding member.

On the other hand, as illustrated in FIG. 3B, on the substrate 10, LEDs 42 are provided in a 1-to-1 relationship with the TIR lenses 41 at positions opposite the TIR lenses 41.

More specifically, for example, an LED 42a is provided opposite the TIR lens 41a, and an LED 42b is provided opposite the TIR lens 41b. Also, an LED 42c is provided opposite the TIR lens 41c, and an LED 42d is provided opposite the TIR lens 41d.

Here, the LEDs 42 are examples of light-emitting elements. Also, the term "LEDs 42" refers collectively to the plurality of LEDs including the LEDs 42a, 42b, 42c, and 42d. The light source device 1 includes a total of 63 LEDs 42, corresponding to the 63 total TIR lenses 41.

Each of the plurality of LEDs 42 is electrically connected to a drive circuit 20 via the substrate 10 and emits light in response to a drive voltage applied from the drive circuit 20. Also, the plurality of LEDs 42 are configured such that switching between light emission and no light emission, light intensity of the light emission, and the like can be individually controlled in response to control signals input to the drive circuit 20.

In the present embodiment, the LEDs 42 emit white light, for example. However, the LEDs 42 are not limited to emitting white light and may emit monochromatic light. In the case of white light, the white light can be selected from among various types including a light bulb color, a daytime white color, a daylight color, and the like.

The light emitted by the LEDs 42 is guided by the TIR lenses 41 and emitted through the emitting surface 111. The light source device 1 can illuminate the irradiated region with the emitted light. Also, each of the plurality of TIR lenses 41 included in the light guide array unit 11 can irradiate the irradiated region by guiding incident light from the LEDs 42 and then emitting the light through the emitting surface 111.

As illustrated in FIG. 3B, a set of the TIR lens 41a and the LED 42a constitute a light source part 4a, and a set of the TIR lens 41b and the LED 42b constitute a light source part 4b. Also, a set of the TIR lens 41c and the LED 42c constitute a light source part 4c, and a set of the TIR lens 41d and the LED 42d constitute a light source part 4d. Note that the term "light source parts 4" refers collectively to the plurality of light source parts including the light source parts 4a, 4b, 4c, 4d, and the like. The light source device 1 includes a total of 63 light source parts 4, each constituted by a set of the TIR lens 41 and the LED 42.

However, it is not necessary that all TIR lenses 41 and LEDs 42 are provided in a 1-to-1 relationship, and one or more of the TIR lenses 41 or one or more of the LEDs 42 may be provided individually and not in a set.

The positional relationship between the TIR lens 41 and the LED 42 in the light source part 4 changes depending on the position of the light source part 4 in the placement region 12. Specifically, the greater the distance between the light source part 4 and a center axis 14 of the placement region 12, the greater the distance between the center of the LED 42 and the center axis of the TIR lens 41. In other words, in order of the light source parts 4a, 4b, 4c, and 4d, the distance between the center of the LED 42 and the center axis 41ac, 41bc, 41cc, 41dc of the TIR lens 41 increases. Here, the term "center axis 14 of the placement region 12" refers to an axis that extends through substantially the center of the placement region 12 and is substantially orthogonal to the placement region 12 (an axis substantially parallel with the Z axis).

As illustrated in FIG. 3B, the center of the LED 42a is substantially aligned with the center axis 41ac of the TIR lens 41a. The center of the LED 42b is offset in the +X direction with respect to the center axis 41bc of the TIR lens 41b. The center of the LED 42c is further offset in the +X direction with respect to the center axis 41cc of the TIR lens 41c, with the offset being greater than the offset of the LED 42b with respect to the center axis 41bc of the TIR lens 41b. The center of the LED 42d is further offset in the +X direction with respect to the center axis 41dc of the TIR lens 41d, with the offset being greater than the offset of the LED 42c with respect to the center axis 41cc of the TIR lens 41c.

Also, as illustrated in FIG. 3A, the light source parts 4n disposed in a triangular grid region 5 indicated by a two-dot dash line rectangle are arranged in a triangular grid. Further, in the placement region 12, the light source parts 4a, 4b, 4c, and 4d are arranged in a rectangular grid. The light source part 4d also serves as one of light source parts disposed in the triangular grid region 5 and arranged in a triangular grid.

The TIR lenses 41n included in the light source parts 4n are arranged in a triangular grid. Further, in the placement region 12, the TIR lenses 41a, 41b, 41c, and 41d are arranged in a rectangular grid. The TIR lens 41d also serves as one of the TIR lenses disposed in the triangular grid region 5 and arranged in a triangular grid.

The triangular grid arrangement and the rectangular grid arrangement will be described in detail. For the sake of convenience, in the description, when the light source device 1 is viewed in a plan view, a certain light source part is defined as a first light source part and a light source part adjacent to the first light source part in a first direction is defined as a second light source part. Also, a light source part adjacent to the first light source part in a second direction orthogonal to the first direction is defined as a third light source part. Also, a light source part adjacent to the third light source part in the first direction and adjacent to the second light source part in the second direction is defined as a fourth light source part. In FIGS. 3A and 3B, the Y direction corresponds to the first direction, and the X direction corresponds to the second direction. Note that "adjacent" refers to being adjacent to each other.

The triangular grid arrangement refers to that the central position between the first light source part and the second light source part in the first direction and the center of the third light source part are aligned in the second direction.

In the present embodiment, compared to a case in which the first light source part and the third light source part are disposed with the center of the first light source part and the center of the third light source part aligned in the second direction, it is particularly preferable that the first light source part and the third light source part are disposed with less distance between the center of the first light source part and the center of the third light source part in the second direction. With such a triangular grid arrangement, the first to third light source parts can be disposed with a high density.

Note that the triangles in the triangular grid arrangement include an equilateral triangle, an isosceles triangle, and other types of triangles. Arrangement in equilateral triangles or isosceles triangles with a line connecting the center of the first light source part and the center of the second light source part as the bottom side allow the first to third light source parts to be arranged in a higher density, and thus is preferable.

The term "rectangular grid arrangement" refers to that the center of the first light source part and the center of the third light source part are aligned in the second direction and the center of the second light source part and the center of the fourth light source part are aligned in the second direction. Note that the rectangles in the rectangular grid arrangement include at least one of squares or rectangles.

For example, as illustrated in FIG. 3A, a light source part $4p_1$ corresponds to the first light source part. A light source part $4p_2$ is adjacent to the light source part $4p_1$ in the Y direction and thus corresponds to the second light source part. A light source part $4q$ is adjacent to the light source part $4p_1$ in the X direction and thus corresponds to the third light source part. A central position M between a center $4pc_1$ of the light source part $4p_1$ and a center $4pc_2$ of the light source part $4p_2$ and a center $4qc$ of the light source part $4q$ are aligned in the X direction. In this manner, the light source part $4p_1$, the light source part $4p_2$, and the light source part $4q$ are arranged in a triangular grid.

Also, as illustrated in FIG. 3A, a light source part $4s$ corresponds to the first light source part. A light source part $4u$ is adjacent to the light source part $4s$ in the Y direction and thus corresponds to the second light source part. A light source part $4t$ is adjacent to the light source part $4s$ in the X direction and thus corresponds to the third light source part. A light source part $4v$ is adjacent to the light source part $4u$ in the X direction and adjacent to the light source part $4t$ in the Y direction and thus corresponds to the fourth light source part.

A center $4sc$ of the light source part $4s$ and a center $4tc$ of the light source part $4t$ are aligned in the X direction, and a center $4uc$ of the light source part $4u$ and a center $4vc$ of the light source part $4v$ are aligned in the X direction. In this manner, the light source parts $4s$, $4t$, $4u$, and $4v$ are arranged in a rectangular grid.

Note that the center of the light source part is located on the center axis (on the center axis of the TIR lens in the present embodiment) of the light guiding member included in the light source part. Also, the center position of the light source part does not need to be the center position of the light source part in a strict sense and may be substantially the center position of the light source part. The term "substantially" indicates allowing for a difference that is typically regarded as error. A difference that is typically regarded as error is, for example, a deviation of ⅕ or less of the designed values.

The central position between the first light source part and the second light source part does not need to be the central position in a strict sense and may be substantially the central position. Also, an arrangement in which the central position and the center or two centers are aligned in the second direction does not require a parallel arrangement in the second direction in a strict sense and being substantially parallel in the second direction is sufficient.

In another aspect, with a distance between the center of the first light source part and the center of the second light source part in the Y direction being defined as D, if the distance between the center of the first light source part and the center of the third light source part in the Y direction is D/5 or less and the distance between the center of the second light source part and the center of the fourth light source part in the Y direction is D/5 or less, the first to fourth light source parts are arranged in a rectangular grid.

On the other hand, if a distance between the central position M between the center of the first light source part and the center of the second light source part and the center of the third light source part in the Y direction being D/5 or less is satisfied, the first to third light source parts are arranged in a triangular grid. Also, preferably, both the shortest distance between the center of the first light source part and the center of the third light source part and the shortest distance between the center of the second light source part and the center of the third light source part are in a range from D/2 to 2×D.

The positional relationship between the light source parts $4p_1$, $4p_2$, and $4q$ included in the triangular grid region 5 is describe above. The same applies to all of the other light source parts included in the triangular grid region 5.

Also, while the positional relationship in a case in which the second light source part is disposed on the −Y direction side of the first light source part and the third light source part is disposed on the +X direction side of the first light source part is described above as one example, the positional relationship between the first to fourth light source parts is not limited thereto. For example, the same also applies to a positional relationship in which the second light source part is disposed on the +Y direction side of the first light source part and the third light source part is disposed on the −X direction side of the first light source part.

The light source part $4n$ is an example of a light source part disposed in the peripheral portion of the placement region 12. Additionally, a center line $410n$ of the TIR lens $41n$ in the light source part $4n$ is inclined at a predetermined angle with respect to the rectangular grid arrangement direction (for example, the X direction) of the light source parts $4a$, $4b$, $4c$, $4d$, and the like. The predetermined angle is 45 degrees, for example. In the present embodiment, in a top view, the TIR lenses included in the light source parts disposed in the peripheral portion of the placement region 12 have a substantially elliptical shape. However, even in this case, inclination of the center line $410n$ by a predetermined angle with respect to the arrangement direction allows the substantially elliptical TIR lenses to be arranged with a higher density.

The light source parts $4a$, $4b$, $4c$, and $4d$ are each an example of a light source part disposed in the central portion of the placement region 12.

Figure 4:
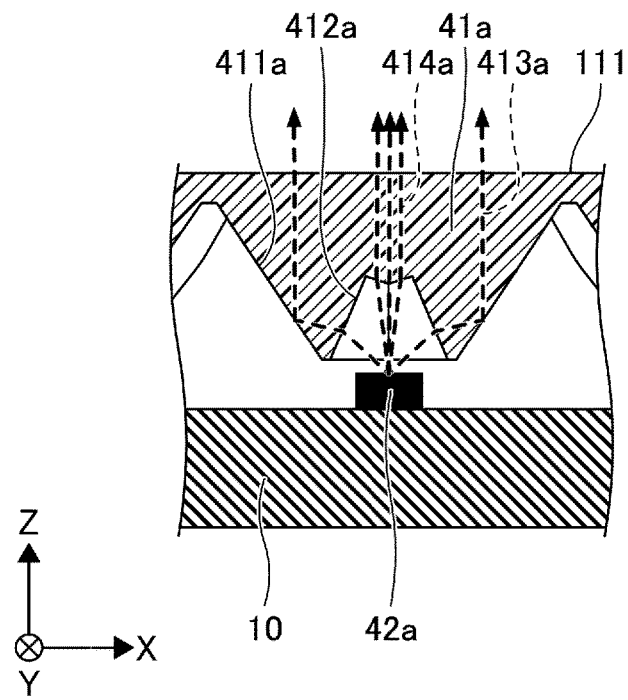
FIG. 4 is a partially enlarged view of a region B in FIG. 3B.

Subsequently, light guidance by the TIR lenses 41 of the light emitted by the LEDs 42 will be described. FIG. 4 is a partially enlarged view of a region B defined by the dashed line square in FIG. 3B and is a diagram for describing an example of how light emitted by the LEDs 42 is guided by the TIR lenses 41.

As illustrated in FIG. 4, the diverging light emitted from the LED $42a$ to the +Z direction side travels through the truncated cone surface $412a$ and is incident on the interior of the TIR lens $41a$. Incident light $413a$ (indicated by dashed line arrows) that travels through an inclined surface portion of the truncated cone surface $412a$ is completely reflected at the total reflection surface $411a$ and then is emitted through the emitting surface 111.

Note that the shape and angle of the inclined surface portion of the truncated cone surface $412a$ and the total reflection surface $411a$ are determined such that the light that is incident on the interior of the TIR lens $41a$ after travelling through the truncated cone surface $412a$ satisfies the total reflection condition and is incident on the total reflection surface $411a$. Of the diverging light emitted by the LED $42a$, the light emitted from the emitting surface 111 after being completely reflected at the total reflection surface $411a$ is referred to as first center light of the TIR lens $41a$.

On the other hand, incident light $414a$ incident on the interior of the TIR lens $41a$ after travelling through an upper bottom portion of the truncated cone surface $412a$ reaches the emitting surface 111 without reaching the total reflection surface 411a and then is emitted via the emitting surface 111. Of the diverging light emitted by the LED 42a, the light emitted from the emitting surface 111, bypassing the total reflection surface 411a, is referred to as second center light of the TIR lens 41a.

The light intensity, the angle of light spread, and the like of the first center light and the second center light can be set to a desired state by determining the angle, shape, and the like of the total reflection surface 411a and the truncated cone surface 412a. Note that, although the TIR lens 41a is used in this example of light guidance by a TIR lens of light emitted by an LED, the same light guiding function applies to the other TIR lenses as well.

Figure 5:
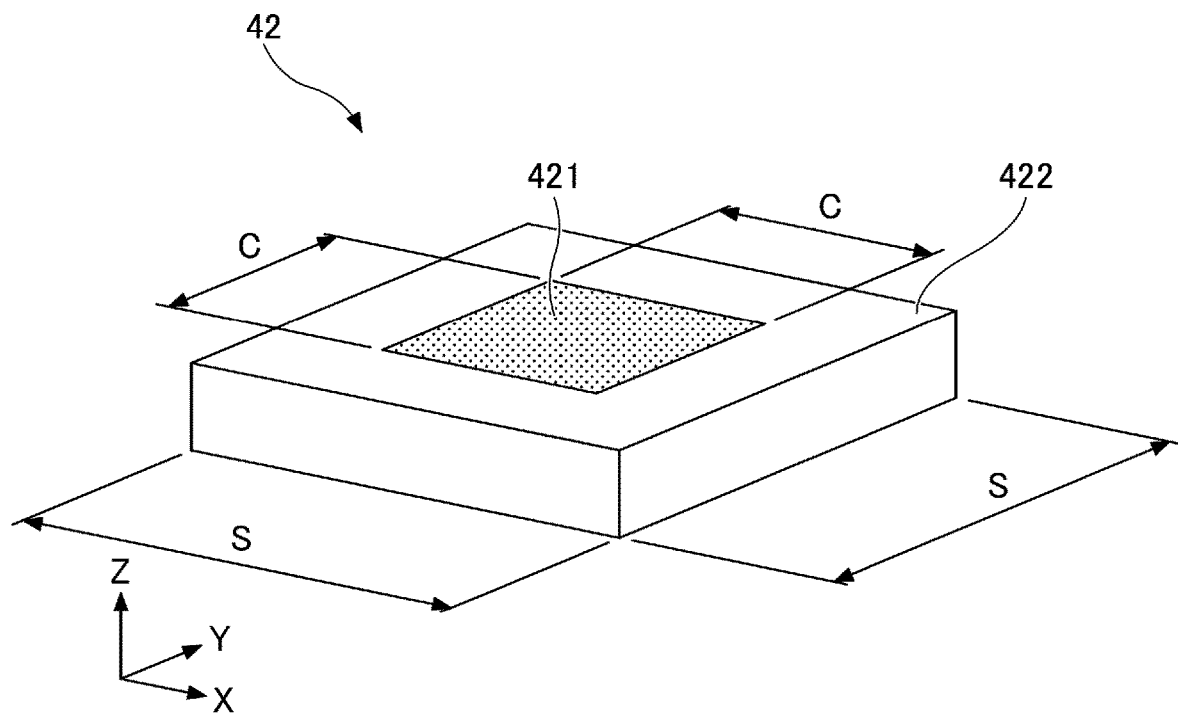
FIG. 5 is a diagram illustrating an example of the configuration of an LED.

Subsequently, FIG. 5 is a diagram for describing an example of the configuration of the LEDs 42. In FIG. 5, one representative example of the plurality of LEDs 42 is illustrated. The plurality of LEDs 42 all have the same configuration, but is not limited thereto. The plurality of LEDs 42 may include LEDs with different configurations.

The LED 42 has a substantially square-shaped block shape in a plan view. A light-emitting part 421 is provided at the center of the LED 42. The LED 42 can emit white light from the light-emitting part 421.

In a cross-sectional view through the center of the LED 42, preferably, the LED 42 is located between the two lower ends of the truncated cone surface 412 of the TIR lens 41 in the X direction or the Y direction and has a length S in the X direction and the Y direction in a range from 480 µm to 620 µm. Also, a length C of the light-emitting part 421 in the X direction and the Y direction is preferably in a range from 280 µm to 420 µm. The LED 42 is disposed substantially line-symmetrical with respect to the center line of the TIR lens in each light source part.

Note that the dimensions of the LED 42 and the dimensions of the light-emitting part 421 can be adjusted as appropriate.

The LED 42 includes at least a light-emitting element, a wavelength conversion member disposed above the light-emitting element and containing a wavelength conversion substance, and a cover member having light reflectivity and covering at least a lateral surface of the light-emitting element and a lateral surface of the wavelength conversion member. In FIG. 5, the light-emitting part 421 includes the light-emitting element and the wavelength conversion member, and a periphery 422 of the light-emitting part 421 includes the cover member.

The light-emitting element is a semiconductor element that emits light when voltage is applied. The light-emitting element includes at least a semiconductor multilayer body and is provided with electrodes having different polarities, for example, a p-side electrode and an n-side electrode. A nitride semiconductor, which is adapted to emit short wavelength light that can efficiently excite a wavelength conversion substance contained in the wavelength conversion member, can be preferably used as a material of the semiconductor. The nitride semiconductor is mainly represented by the general formula $In_xAl_yGa_{1-x-y}N$ (0≤x, 0≤y, x+y≤1). An emission peak wavelength of the light-emitting element is preferably in a range from 400 nm to 530 nm, more preferably in a range from 420 nm to 490 nm, and even more preferably in a range from 450 nm to 475 nm from the viewpoints of light emission efficiency, excitation of the wavelength conversion substance, a color mixing relationship with the light emission thereof, and the like. Further, as the material of the semiconductor, an InAlGaAs semiconductor, an InAlGaP semiconductor, or the like can be used.

The wavelength conversion member is a member that contains a wavelength conversion substance in a resin such as silicone as a base material. The wavelength conversion substance is a material that absorbs at least a portion of primary light emitted by the light-emitting element, and emits secondary light of a wavelength different from that of the primary light. Examples of the wavelength conversion substance include an yttrium aluminum garnet-based phosphor ($Y_3(Al,Ga)_5O_{12}$:Ce, for example), a lutetium aluminum garnet-based phosphor ($Lu_3(Al,Ga)_5O_{12}$:Ce, for example), a terbium aluminum garnet-based phosphor ($Tb_3(Al,Ga)_5O_{12}$:Ce, for example), a β-SiAlON phosphor (($Si,Al)_3(O,N)_4$:Eu, for example), an α-SiAlON phosphor ($Mz(Si,Al)_{12}(O,N)_{16}$ (where 0<z≤2, and M is Li, Mg, Ca, Y, or a lanthanoid element excluding La and Ce)), a nitride phosphor such as a CASN-based phosphor ($CaAlSiN_3$:Eu, for example) or an SCASN-based phosphor (($Sr,Ca)AlSiN_3$:Eu, for example), a fluoride phosphor such as a KSF-based phosphor ($K_2SiF_6$:Mn, for example) or an MGF-based phosphor ($3.5MgO·0.5MgF_2·GeO_2$:Mn, for example), a CCA phosphor (for example, $(Ca,Sr)_{10}(PO_4)_6Cl_2$:Eu), a quantum dot phosphor, and the like. Furthermore, one type of these phosphors can be used alone, or two or more types of these phosphors can be used in combination, as the wavelength conversion substance.

The cover member preferably has light reflectivity in order to extract light from the light-emitting element toward an upper surface side (+Z direction), and the width ((the length S−the length C)/2) of the periphery 422 of the light-emitting part 421 in a plan view is preferably 100 µm or greater. For example, the light reflectivity of the cover member with respect to an emission peak wavelength of the light-emitting element is preferably 70% or greater, more preferably 80% or greater, and even more preferably 90% or greater. Further, the cover member is preferably white, and preferably contains a white pigment, such as titanium oxide, magnesium oxide, or the like, for example, in the base material of the cover member. Examples of the base material of the cover member 40 include a resin such as silicone, epoxy, phenol, polycarbonate, acrylic, and the like, and a modified resin thereof.

Subsequently, the arrangement of the different types of light source parts will be described with reference to FIG. 6. As used herein, the term "types of the light source parts" refer to types of light source parts obtained by classification into groups with common characteristics or forms. In the present embodiment, the light source parts are classified according to positions of the light source parts. More specifically, the light source parts disposed at an equal distance from the center axis 14 of the placement region 12 are defined as being the same type of light source parts.

Figure 6:
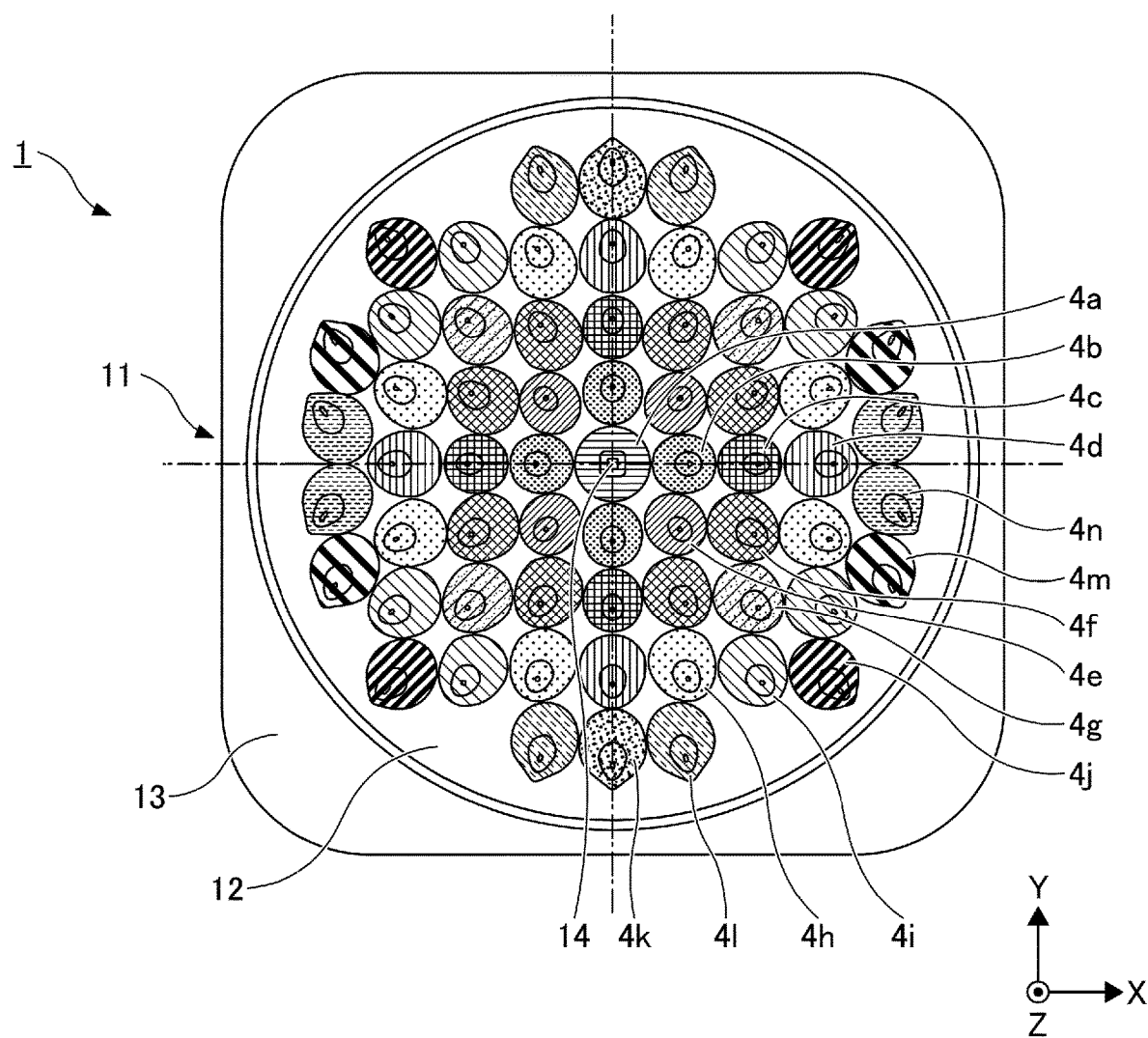
FIG. 6 is a diagram illustrating an example of an arrangement of various types of light source parts.

FIG. 6 is a diagram for describing an example of the arrangement of the various types of the light source parts 4. As in FIG. 3A, FIG. 6 illustrates the configuration on the −Z direction side of the placement region 12, with the +Z direction side surface of the placement region 12 of the light guide array unit 11 being illustrated in a see-through manner. In the present embodiment, a total of 63 light source parts 4 are classified into 14 types from the light source part 4a to the light source part 4n. In FIG. 6, the light source parts 4a to 4n are displayed in their classifications via various types of hatching.

For example, the one light source part disposed in the center of the 63 light source parts 4 corresponds to the light source part 4a. The four light source parts disposed adjacent to the light source part 4a in the +X direction side, the −X direction side, the +Y direction side, and the −Y direction side correspond to the light source parts 4b. The four light source parts classified as the light source parts 4b are disposed at an equal distance from the center axis 14 of the placement region 12.

The light source parts 4a to 4n are different types depending on the position where they are disposed. Also, the quantity of light source parts that can be disposed is varied depending on position, and thus the quantity of light source parts of each type is also varied. Table 1 is a list of the quantity of each type of the light source parts 4a to 4n.

TABLE 1

| Component number of light source part | Quantity |
|---|---|
| 4a | 1 |
| 4b | 4 |
| 4c | 4 |
| 4d | 4 |
| 4e | 4 |
| 4f | 8 |
| 4g | 4 |
| 4h | 8 |
| 4i | 8 |
| 4j | 4 |
| 4k | 2 |
| 4l | 4 |
| 4m | 4 |
| 4n | 4 |

Figure 7:
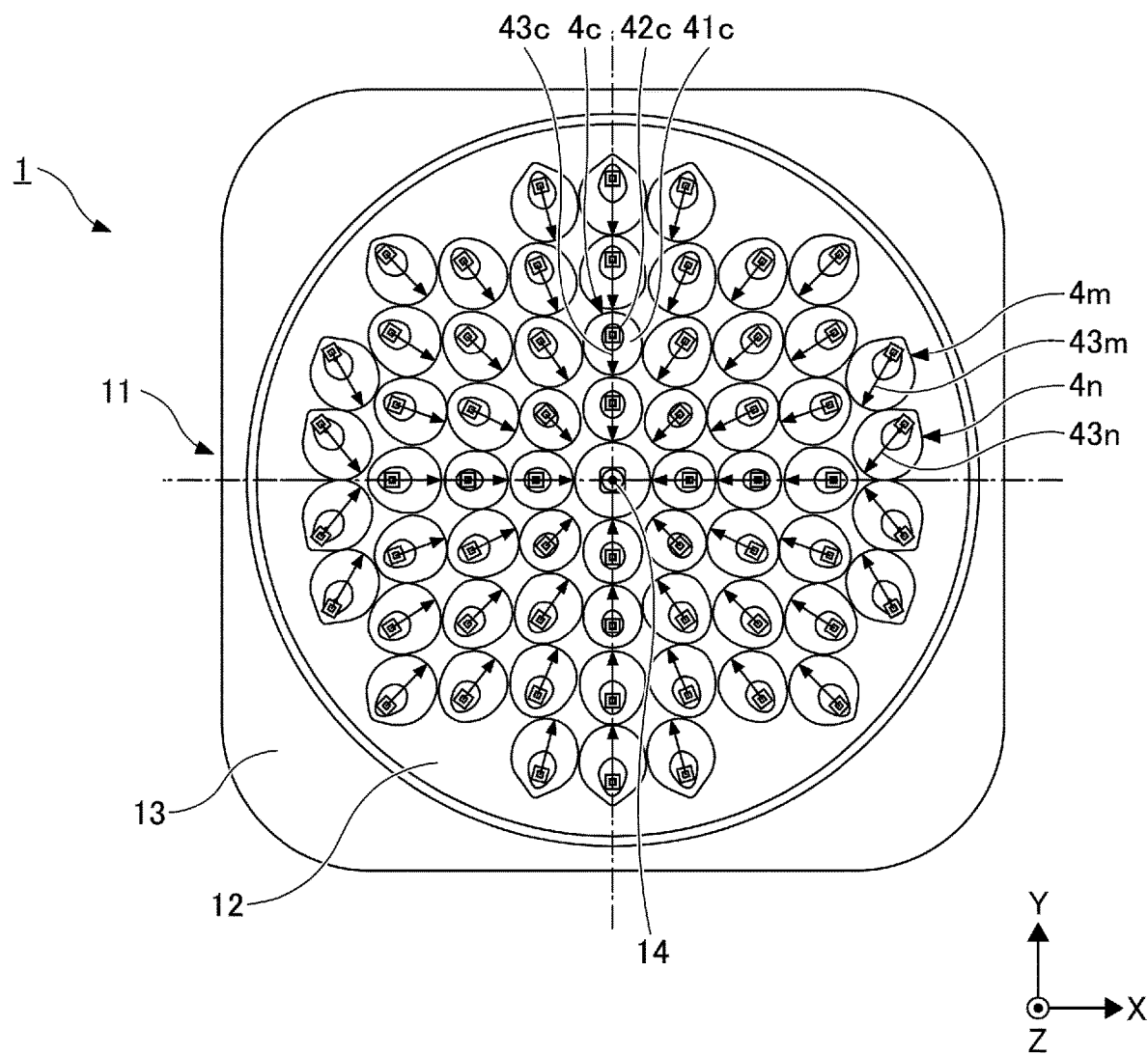
FIG. 7 is a diagram illustrating an example of the orientation of an optical axis of each of a plurality of light source parts.

Subsequently, FIG. 7 is a diagram for describing an example of the orientations of the optical axes of the plurality of light source parts 4. FIG. 7 illustrates the light source parts including the TIR lenses and the LEDs on the −Z direction side of the placement region 12, with the +Z direction side surface of the placement region 12 of the light guide array unit 11 being illustrated in a see-through manner.

Here, the optical axis of the light source part refers to the center axis of the light beam emitted by the light source part. The light beam emitted by the light source part is irradiation light from the light source part and is diverging light, focused light, parallel light, or the like. The orientation of the optical axis is determined according to the shape of the TIR lens included in the light source part, the positional relationship between the TIR lens and the LED, and the like. The shape of the TIR lens is, for example, the shape according to the orientation of the center line of the TIR lens. The light source part can emit light in the direction aligned with the orientation of the optical axis.

Of the plurality of light source parts 4, for example, the light source part 4c includes the TIR lens 41c and the LED 42c. An optical axis 43c indicated by the arrow indicates the optical axis of the light source part 4c, and the arrow of the optical axis 43c represents the orientation of the optical axis. The optical axis 43c is orientated toward the center axis 14 of the placement region 12.

As illustrated in FIG. 7, in the light source device 1, of the 63 light source parts 4, the four light source parts 4m and the four light source parts 4n have optical axes that are not orientated toward the center axis 14 of the placement region 12, and the other 55 light source parts 4 have optical axes that are orientated toward the center axis 14 of the placement region 12.

In other words, one or more of the plurality of light source parts 4 include an optical axis 43 orientated in an irradiation direction toward the center axis 14 of the placement region 12. Here, the irradiation direction toward the center axis 14 of the placement region 12 refers to a direction designed to intersect with the center axis of the placement region 12. Note that the term "optical axes 43" refers collectively to the optical axes of the plurality of light source parts including the optical axes 43c, 43m, 43n, and the like.

Figure 8:
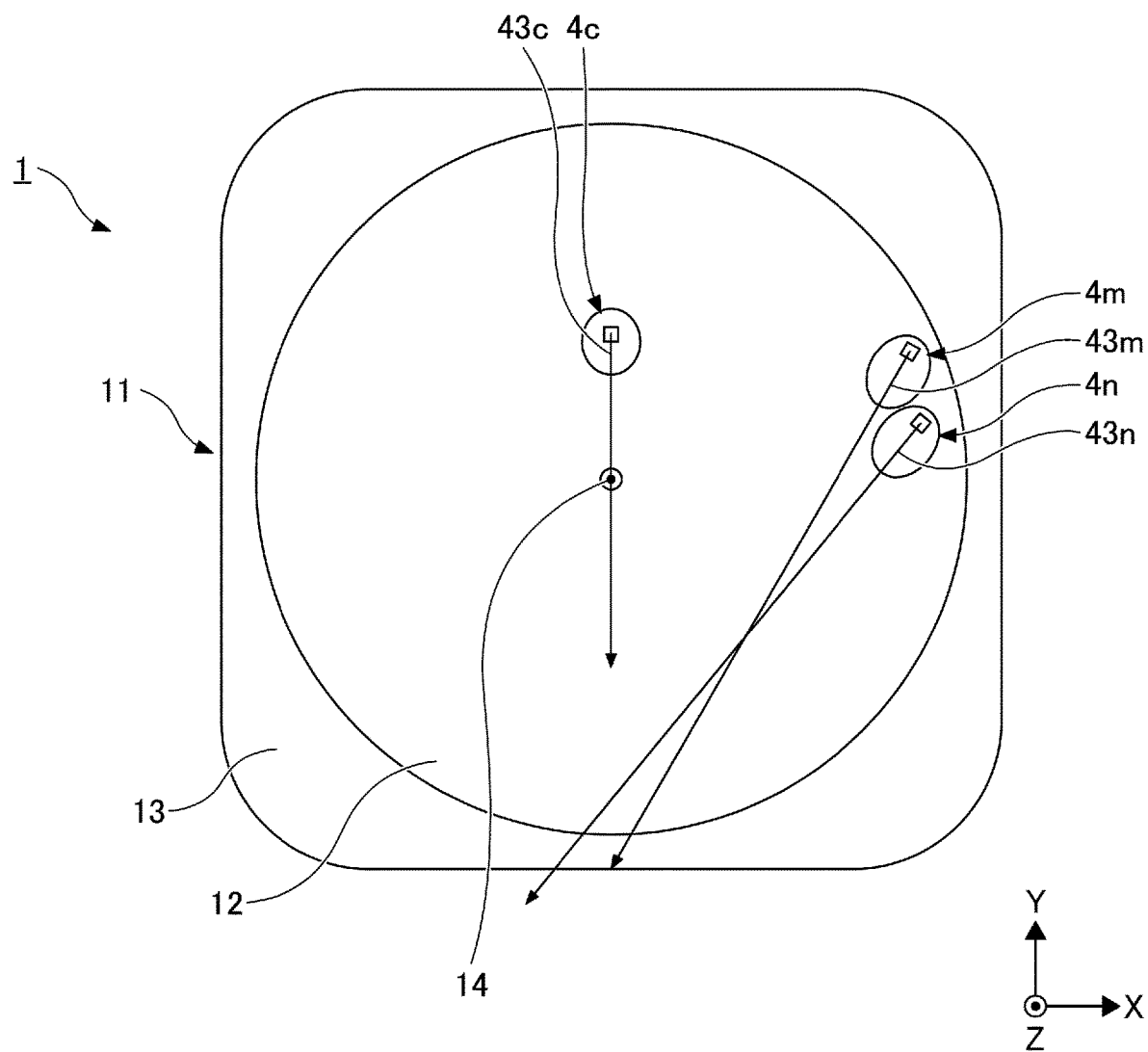
FIG. 8 is a diagram illustrating an example of the relationship between a center axis of a placement region and the orientations of optical axes of light source parts.

FIG. 8 is a diagram for describing in more detail an example of the relationship between the center axis 14 of the placement region 12 and the orientations of the optical axes 43 of the light source parts 4. Although FIG. 8 is a view viewed in a direction similar to the view of FIG. 7, in FIG. 8, to facilitate ease of viewing, of the plurality of light source parts 4, one of the four light source parts 4c, one of the four light source parts 4m, and one of the four light source parts 4n are illustrated, with illustration of the other light source parts being omitted.

In addition, in FIG. 8, to facilitate understanding of the relationship between each of the optical axis 43c of the light source part 4c, the optical axis 43m of the light source part 4m, and the optical axis 43n of the light source part 4n and the center axis 14 of the placement region 12, long, extending arrows indicating the optical axes are illustrated in the directions indicating the respective orientations of the optical axes.

As illustrated in FIG. 8, the optical axis 43c intersects the center axis 14 of the placement region 12. In other words, the light source part 4c disposed in the central portion of the placement region 12 has the optical axis 43c orientated in an irradiation direction toward the center axis 14 of the placement region 12.

Here, the light source device 1 is manufactured such that the optical axis 43c and the center axis 14 of the placement region 12 intersect. However, due to manufacturing errors, the optical axis 43c and the center axis 14 of the placement region 12 do not intersect in a strict sense, and both correspond to a skew position, in some cases. A skew position refers to a positional relationship of two straight lines that are not parallel and do not intersect.

The advantageous effects (described below) of the light source device 1 according to the present embodiment are obtained even when there is a slight skew that can be typically allowed as a manufacturing error. Thus, in the present embodiment, "the optical axis 43c and the center axis 14 of the placement region 12 intersect" includes in its meaning a skew that can be typically allowed as a manufacturing error. Here, the light source part 4c is illustrated as an example. However, the same applies to light source parts of the plurality of light source parts 4 other than the light source parts 4m and 4n.

On the other hand, the optical axis 43m and the optical axis 43n do not intersect the center axis 14 of the placement region 12. In other words, the light source part 4m disposed in the peripheral portion of the placement region 12 has the optical axis 43m orientated in an irradiation direction at a skew position with respect to the center axis 14 of the placement region 12. In a similar manner, the light source part 4n disposed in the peripheral portion of the placement region 12 has the optical axis 43n orientated in an irradiation direction at a skew position with respect to the center axis 14 of the placement region 12. That is, one or more of the light source parts disposed in the peripheral portion of the placement region 12 include the optical axis 43 orientated in an irradiation direction at a skew position with respect to the center axis 14 of the placement region 12.

In other words, in the light source device 1, the light source part 4c, which is one of the plurality of light source parts 4, has the optical axis 43c orientated in an irradiation direction toward the center axis 14, which is the axis orthogonal to the plane of the placement region 12. Also, the light source part 4m, which is one of the plurality of light source parts 4, has the optical axis 43m orientated in an irradiation direction at a skew position with respect to the center axis 14, which is the axis orthogonal to the plane of the placement region 12. The light source part 4n, which is one of the plurality of light source parts 4, has the optical axis 43n orientated in an irradiation direction at a skew position with respect to the center axis 14, which is the axis orthogonal to the plane of the placement region 12.

In the light guide array unit 11, light irradiated from some TIR lenses 41 of the plurality of TIR lenses 41, each corresponding to a respective one of the plurality of light source parts 4, have respective optical axes each orientated in an irradiation direction toward the center axis 14, which is the axis orthogonal to the plane of the placement region 12. Also, the light irradiated from some TIR lenses 41 of the plurality of TIR lenses 41 have respective optical axes each orientated in an irradiation direction at a skew position with respect to the center axis 14, which is the axis orthogonal to the plane of the placement region 12. Note that in FIGS. 7 and 8, the optical axes of the light irradiated from the TIR lenses 41 are aligned with the optical axes 43 of the light source parts 4.

Figure 9:
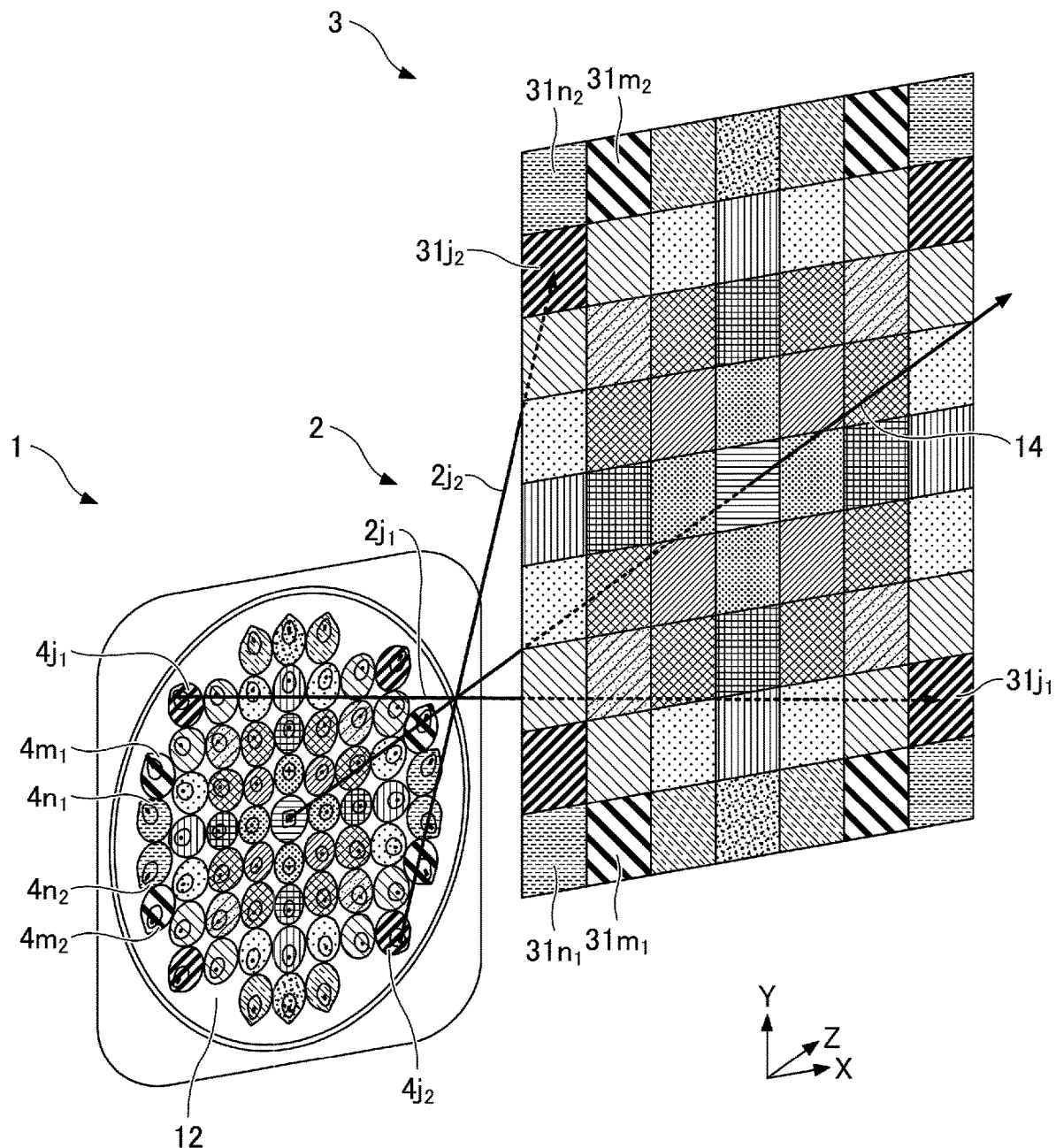
FIG. 9 is a diagram illustrating an example of an arrangement in an irradiated region of irradiation light from light source parts.

Example of Arrangement Inside Irradiated Region of Irradiation Light from Light Source Parts Subsequently, the arrangement in the irradiated region of the irradiation light from each of the plurality of light source parts will be described with reference to FIG. 9. FIG. 9 is a diagram for describing an example of the arrangement in the irradiated region of the irradiation light from the light source parts.

As illustrated in FIG. 9, the light source device 1 irradiates the irradiated region 3 with the irradiation light 2. The diagram of the matrix shown inside the irradiated region 3 in FIG. 9 represents partial regions illuminated by the irradiation light from the plurality of light source parts. The illustrated different types of hatching in the partial regions correspond to the types of the light source parts. The irradiated region 3 is formed of a collective of the partial regions. In FIG. 9, each of the partial regions is illuminated by the irradiation light from a respective one of the light source parts 4 in 1-to-1 relationship, but this illustration is not intended as a limitation to that the light emitted from the light source parts 4 actually illuminates only the corresponding partial regions. The partial regions corresponding to the light source parts 4 are regions that are the target of irradiation by the light source parts 4. Thus, actually, light emitted from one of the light source parts 4 may also illuminate one or more adjacent partial regions (or a nearby partial region).

Of the plurality of light source parts 4, each of the light source parts other than the light source parts 4m and 4n has the optical axis 43 orientated in an irradiation direction toward the center axis 14 of the placement region 12. Thus, the irradiation light from the light source parts other than the light source parts 4m and 4n illuminates partial regions 31 at positions symmetrically opposite to each other with respect to the center axis 14 of the placement region 12 in the irradiated region 3.

For example, irradiation light $2j_1$ from a light source part $4j_1$ illuminates a partial region $31j_1$ at a position symmetrically opposite to the light source part $4j_1$ with respect to the center axis 14 of the placement region 12. Also, irradiation light $2j_2$ from a light source part $4j_2$ illuminates a partial region $31j_2$ at a position symmetrically opposite to the light source part $4j_2$ with respect to the center axis 14 of the placement region 12.

The light source parts 4 other than the light source parts 4m and 4n are similar to the light source parts 4j. Note that the term "partial regions 31" refers collectively to a plurality of partial regions including the partial regions $31j_1$, $31j_2$, and the like.

Here, in the present embodiment, in order to dispose the plurality of light source parts 4 in the placement region 12 with a circular planar shape and dispose as many light source parts 4 as possible in the placement region 12, the plurality of light source parts 4 are disposed in an overall circular external shape corresponding to the external shape of the placement region 12.

Accordingly, for example, when all of the light source parts 4 emit light toward the center axis 14 of the placement region 12, the irradiated region 3 with the arrangement of irradiation light from the plurality of light source parts 4 is a circular region corresponding to the arrangement of the plurality light source parts 4.

In contrast, in the present embodiment, because the light source parts 4m and 4n of the plurality of light source parts 4 emit light at a skew position with respect to the center axis 14 of the placement region 12, the irradiated region 3 is a rectangular region.

For example, a light source part $4m_1$ emits light at a skew position with respect to the center axis 14 of the placement region 12, illuminating a partial region $31m_1$, and a light source part $4m_2$ emits light at a skew position with respect to the center axis 14 of the placement region 12, illuminating a partial region $31m_2$. Also, a light source part $4n_1$ emits light at a skew position with respect to the center axis 14 of the placement region 12, illuminating a partial region $31n_1$, and a light source part $4n_2$ emits light at a skew position with respect to the center axis 14 of the placement region 12, illuminating a partial region $31n_2$. Accordingly, the irradiated region 3 is a rectangular region.

The light emitted by the plurality of light source parts forms a matrix arrangement in the irradiated region 3 with a rectangular shape. Because the plurality of light source parts 4 are disposed in the placement region 12 with a circular planar shape, in a combination of a rectangular grid and a triangular grid, one or more of the plurality of light source parts 4 are arranged in a different arrangement from the irradiation light arrangement in the irradiated region 3.

The light irradiated from the TIR lenses included in the plurality of light source parts forms a matrix arrangement in the irradiated region 3 with a rectangular shape. With the TIR lenses included in the plurality of light source parts 4 disposed in the placement region 12 with a circular planar shape, and arranged in a combination of a rectangular grid and a triangular grid, one or more of the TIR lenses included in the plurality of light source parts 4 are arranged in a different arrangement from the irradiation light arrangement in the irradiated region 3.

In the example illustrated in FIG. 9, each of the plurality of partial regions 31 is a rectangular region, but they not limited thereto. The regions may be circular, elliptical, or the like. In addition, the light emitted by the plurality of light source parts may form a matrix arrangement in the irradiated region 3 with the light emitted by adjacent light source parts partially overlapping. Furthermore, the light emitted by the plurality of light source parts may form a matrix arrangement in the irradiated region 3 with gaps formed between the light emitted by adjacent light source parts.

Advantageous Effects of Light Source Device 1 and Light Guide Array Unit 11

As described above, in the present embodiment, the plurality of light source parts included in the light source device 1 are disposed in the placement region with a circular planar shape, in a combination of at least a rectangular grid and a triangular grid. The light source parts are disposed in the placement region with a circular planar shape, and the light source device 1 is attached to a device such as a smartphone in a manner such that only the placement region is visible from the outside. Thus, the light source device 1 and the light guide array unit 11 able to be provided have a smart and attractive appearance, with the portion able to be seen by the user having a circular shape.

In the present embodiment, 55 out of the total 63 light source parts 4 are disposed in a rectangular grid (in other words, a matrix pattern), and the remaining eight light source parts 4 are disposed densely in a triangular grid in the peripheral portion of the placement region 12. Also, the light emitted by each of the plurality of light source parts forms a matrix arrangement in the irradiated region. Thus, for example, in cases in which the plurality of light source parts are individually controlled and light is emitted in various patterns, correspondence between a light source part and a partial region illuminated by the light source part, in other words, the irradiation pattern, can be easily comprehended.

In addition, for example, in cases in which the plurality of light source parts are disposed in the placement region with a circular planar shape, in a rectangular grid, when the quantity of light source parts is increased to ensure an amount of irradiation light or the like, the area of the placement region needs to be increased, which may lead to an increase in the size of the light source device. In contrast, in the present embodiment, a combination of at least a rectangular grid and a triangular grid is used for arrangement. According to this configuration, the quantity of the light source parts 4 can be increased without increasing the area of the placement region 12. Thus, compared to a configuration in which the plurality of light source parts 4 are disposed in the placement region 12 with a circular planar shape, in a rectangular grid, the light source device 1 and the light guide array unit 11 can be reduced in size.

In the present embodiment, the light emitted by each of the plurality of light source parts 4 forms a matrix arrangement in the irradiated region 3, and one or more of the plurality of light source parts 4 are arranged in a different arrangement from the irradiation light arrangement in the irradiated region 3. Accordingly, the irradiation pattern in the irradiated region 3 can be easily comprehended, and the plurality of light source parts 4 and TIR lenses 41 can be located inside the placement region 12 of a circular planar shape.

Furthermore, typically, in an information display means, such as a sign or a display plate, characters, photographs, images, and the like are often disposed in a rectangular region. When the irradiated region is a circular region, the entire information contained in the rectangular region of the information display means cannot be efficiently illuminated in some cases. For example, there is a large amount of wasted light that illuminates areas without information. In contrast, in the present embodiment, because the irradiated region is a rectangular region, the light source device 1 and the light guide array unit 11 with a circular shape and a smart and attractive appearance can be provided and the rectangular region of the information display means or the like can be efficiently illuminated.

Also, in the present embodiment, one or more of the plurality of light source parts 4 include an optical axis orientated in an irradiation direction toward the center axis 14 of the placement region 12. For example, when the light source parts 4 emit light in a direction parallel with the center axis 14 of the placement region 12, a portion of the irradiation light may be shaded (blocked) by the housing or the like of the smartphone located in the periphery of the placement region 12. The closer the position of the light source part 4 is to the peripheral edge of the placement region 12, the greater the shading. With the optical axis being orientated in an irradiation direction toward the center axis 14 of the placement region 12, the light can be emitted in a direction away from the peripheral portion of the placement region 12. Thus, shading of the irradiation light caused by a member located in the periphery of the placement region 12 can be reduced, and light can be emitted in a wide angle.

Also, in the present embodiment, of the plurality of light source parts 4, the light source parts 4 disposed in the central portion of the placement region 12 are disposed in a rectangular grid, and, of the plurality of light source parts 4, one or more of the light source parts 4 disposed in the peripheral portion of the placement region 12 are disposed in a triangular grid.

Arrangement of the light source parts 4 in a rectangular grid allows for facilitating comprehension of the irradiation pattern, and arrangement the light source parts 4 in a triangular grid allows the light source parts 4 to be located inside the placement region 12 of a circular planar shape. Accordingly, the irradiated region 3 with a rectangular shape can be formed, and the rectangular region in an information display means or the like can be efficiently illuminated.

Additionally, in the present embodiment, the light source parts 4 disposed in the central portion include an optical axis orientated in an irradiation direction toward the center axis 14 of the placement region 12, and one or more of the light source parts 4 disposed in the peripheral portion has respective optical axes each orientated in an irradiation direction at a skew position with respect to the center axis 14 of the placement region 12.

Accordingly, even in a case in which the plurality of light source parts 4 are disposed in the placement region 12 with a circular planar shape and as many light source parts 4 as possible are disposed in the placement region 12, the irradiated region 3 can be a rectangular region. Also, the rectangular region in an information display means or the like can be efficiently illuminated.

Also, in the present embodiment, the light guiding members included in the plurality of light source parts 4 include the first light guiding member including a total reflection surface that completely reflects light and the second light guiding member including a total reflection surface that completely reflects light, with the shape of the first light guiding member and the shape of the second light guiding member being different. Accordingly, the irradiation direction of the irradiation light from the light source parts can be set to a desired direction depending on the placement position.

Also, in the present embodiment, the plurality of light source parts 4 are connected at the surface side where light is emitted by adjacent light guiding members. According to this configuration, the light guiding members including the plurality of TIR lenses can be integrally formed, allowing the work to assemble the plurality of light guiding members to be reduced and the time and effort involved in the manufacture of the light source device 1 to be reduced.

In addition, in the present embodiment, the plurality of light source parts 4 can individually emit light. Accordingly, various illumination patterns are possible. In addition, the illumination position, illumination direction, illumination area, and the like can be freely switched without moving the light source device 1.

Modified Examples

Subsequently, a modified example of a light source device according to an embodiment will be described. In the embodiment described above, a configuration in which the plurality of light source parts 4 are disposed in the placement region 12 with a circular planar shape, in a combination of at least a rectangular grid and a triangular grid is described, but this is not limited thereto. For example, the plurality of light source parts can be disposed in the placement region 12 with a circular planar shape, in a concentric circular pattern. Furthermore, the TIR lenses included in the plurality of light source parts can be disposed in a concentric circular pattern.

Figure 10A:
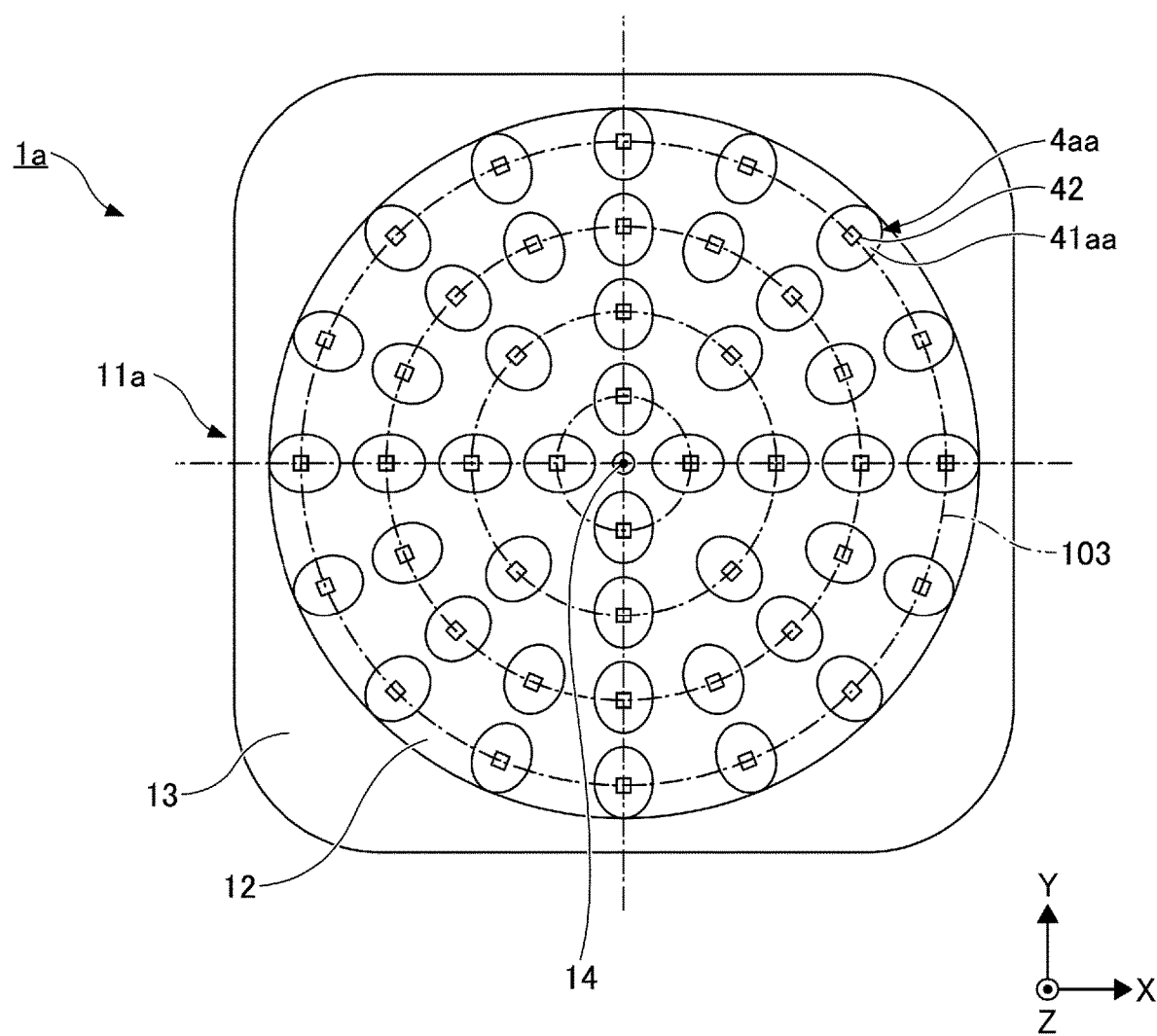
FIG. 10A is a diagram illustrating a first example of an arrangement of a plurality of light source parts according to a modified example.

FIG. 10A is a diagram for describing a first example of the arrangement of a plurality of light source parts according to the modified example. As illustrated in FIG. 10A, a light source device 1a includes a light guide array unit 11a. A plurality of light source parts 4aa each including a TIR lens 41aa and the LED 42 included in the light guide array unit 11a are disposed in a concentric circular pattern.

Here, an arrangement of concentric circular pattern refers to substantially the centers of the light source parts 4aa being disposed on a plurality of circles 103 with different radii centered on the center axis 14 of the placement region 12. Note that the circles 103 indicated by dot-dash lines in FIG. 10A are illustrated to facilitate description of the arrangement of the concentric circular pattern and are not components included in the light source device 1a.

The placement region 12 in the light guide array unit 11a is transmissive of visible light, the user of the smartphone or the like provided with the light source device 1a can see the light source parts 4aa disposed in the placement region 12 from the outside. Arrangement of the light source parts 4aa in a concentric circular pattern allows for ensuring the regularity of the overall arrangement of the plurality of light source parts 4aa. Thus, the appearance when the light source device 1a is seen can be improved.

Figure 10B:
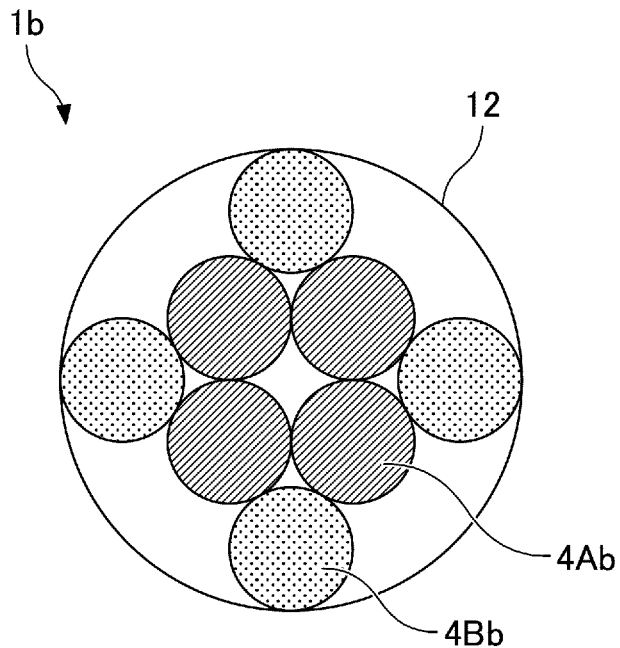
FIG. 10B is a diagram illustrating a second example of an arrangement of a plurality of light source parts according to a modified example.
Figure 10C:
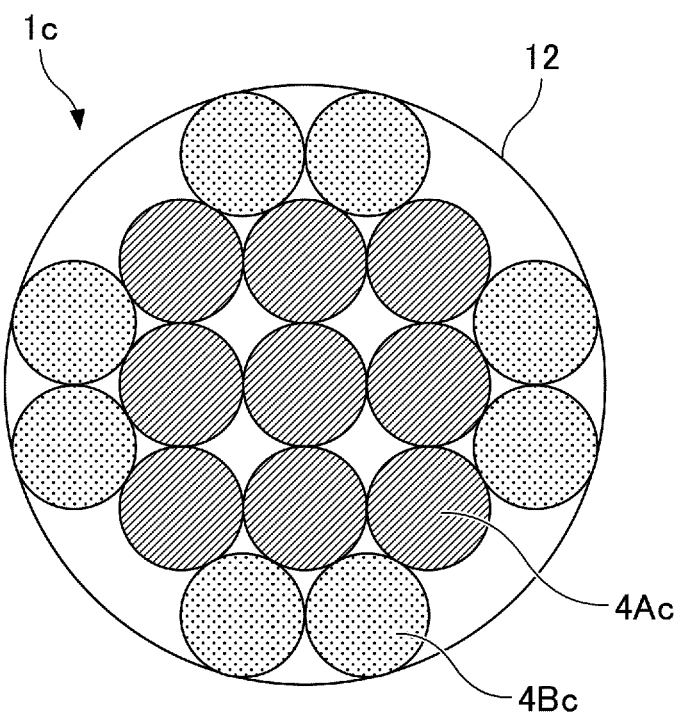
FIG. 10C is a diagram illustrating a third example of an arrangement of a plurality of light source parts according to a modified example.

In the embodiment described above, a configuration in which 63 light source parts 4 or 63 light guiding members (for example, the TIR lenses 41) are disposed is described. However, the quantity of light source parts 4 may be other than 63, and the quantity of light guiding members may be other than 63. FIGS. 10B and 10C are diagrams illustrating examples in which the quantity of light source parts is not 63, with FIG. 10B illustrating a second example of the arrangement of the plurality of light source parts and FIG. 10C illustrating a third example of the arrangement of the plurality of light source parts.

As illustrated in FIG. 10B, a light source device 1b includes four light source parts 4Ab disposed in a rectangular grid and four light source parts 4Bb disposed in a triangular grid (specifically, four light source parts 4Bb corresponding to one in each triangular grid) in the placement region 12. Note that the term "light source parts 4Ab" refers collectively to the light source parts disposed in a rectangular grid, and the term "light source parts 4Bb" refers collectively to the light source parts disposed in a triangular grid. The light source parts 4Ab are illustrated with diagonal hatching, and the light source parts 4Bb are illustrated with dot hatching. The three light source parts 4 arranged in a triangular grid are in any appropriate combination. For example, each of the four light source parts 4Bb of the light source device 1b is a portion of such appropriate combination of three light source parts 4.

As illustrated in FIG. 10C, a light source device 1c includes nine light source parts 4Ac disposed in a rectangular grid and eight light source parts 4Bc disposed in a triangular grid (specifically, eight light source parts 4Bc corresponding to one in each triangular grid) in the placement region 12. Note that the term "light source parts 4Ac" refers collectively to the light source parts disposed in a rectangular grid, and the term "light source parts 4Bc" refers collectively to the light source parts disposed in a triangular grid. The light source parts 4Ac are illustrated with diagonal hatching, and the light source parts 4Bc are illustrated with dot hatching.

Of the nine light source parts 4Ac, the four or more light source parts 4Ac arranged in a rectangular grid are in any appropriate combination. Also, the three or more light source parts 4 arranged in a triangular grid are in any appropriate combination. For example, each of the eight light source parts 4Bc of the light source device 1c is a portion of such an appropriate combination of three light source parts 4.

In order to dispose the plurality of light source parts in a substantially circular pattern, a minimum of eight light source parts 4 are required.

Figure 10D:
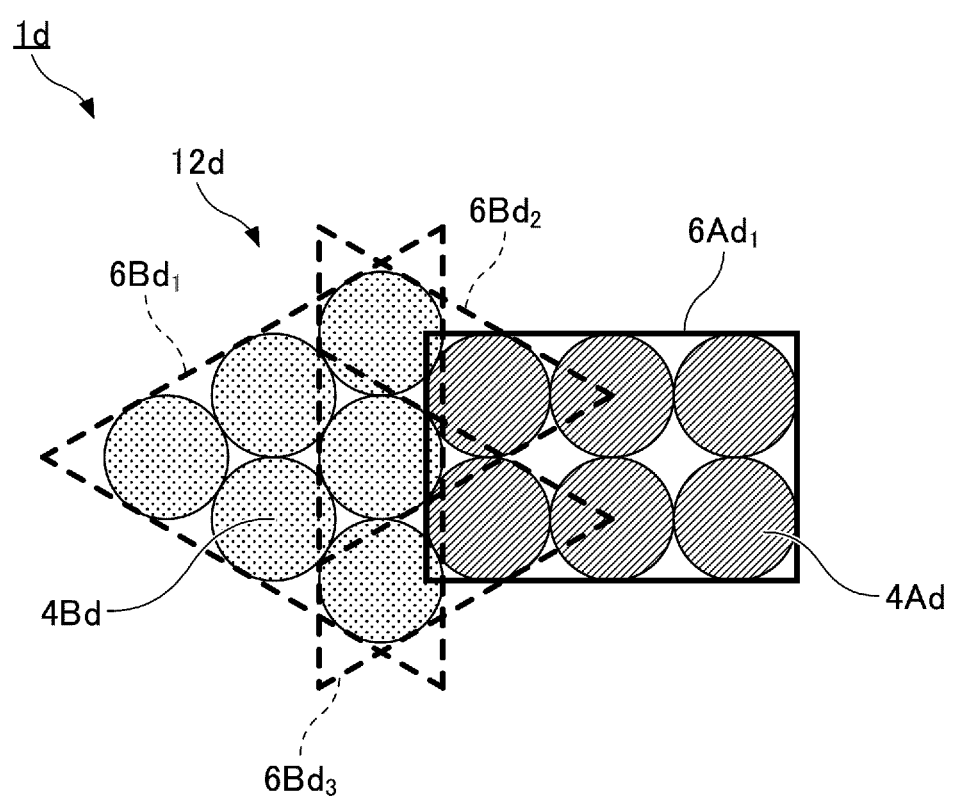
FIG. 10D is a diagram illustrating a fourth example of an arrangement of a plurality of light source parts according to a modified example.
Figure 10E:
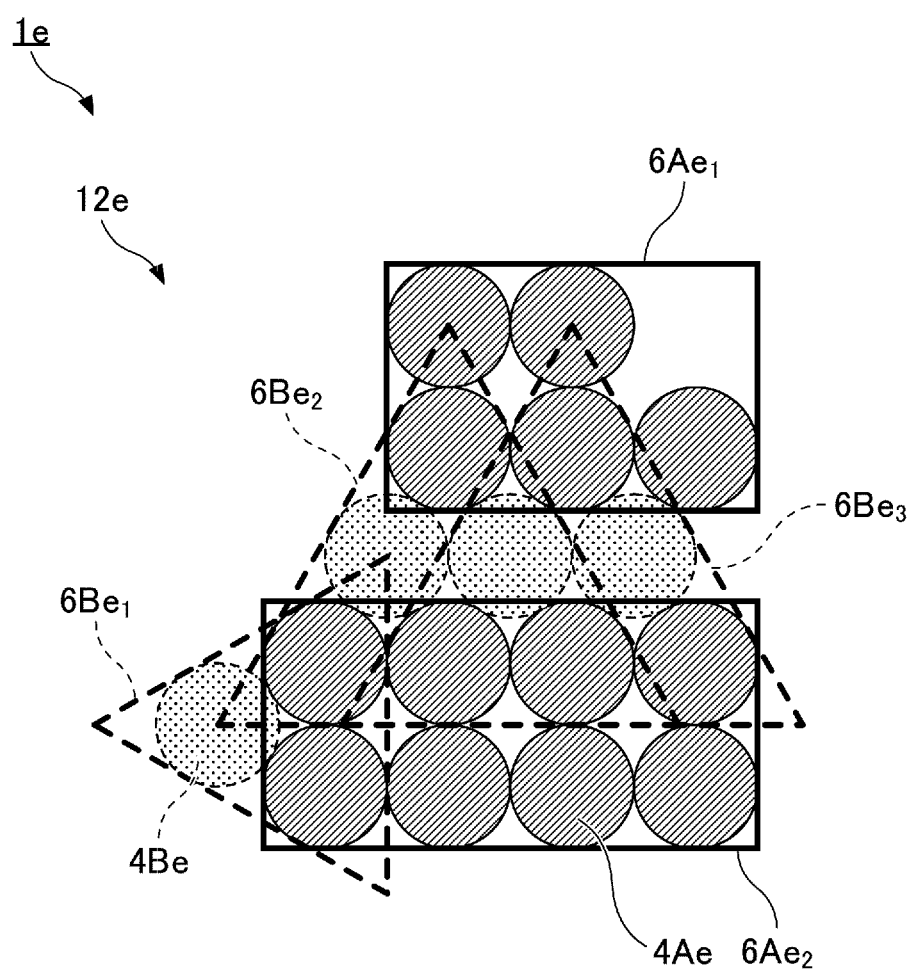
FIG. 10E is a diagram illustrating a fifth example of an arrangement of a plurality of light source parts according to a modified example.

Furthermore, in the embodiment described above, a configuration in which the light source parts 4 are disposed in a circular arrangement is described. However, the light source parts 4 may be disposed in a non-circular arrangement. FIGS. 10D and 10E are diagrams illustrating light source parts disposed in a non-circular arrangement, with FIG. 10D illustrating a fourth example of the arrangement of the plurality of light source parts and FIG. 10E illustrating a fifth example of the arrangement of the plurality of light source parts.

FIG. 10D illustrates a light source device 1d and at least a portion of the plurality of light source parts provided in a placement region 12d with any appropriate shape in a plan view. The light source device 1d includes six light source parts 4Ad disposed in a rectangular grid and six light source parts 4Bd disposed in a triangular grid. Note that the term "light source parts 4Ad" refers collectively to the light source parts disposed in a rectangular grid, and the term "light source parts 4Bd" refers collectively to the light source parts disposed in a triangular grid. The light source parts 4Ad are illustrated with diagonal hatching, and the light source parts 4Bd are illustrated with dot hatching.

Of the six light source parts 4Ad, four or more light source parts 4Ad arranged in a rectangular grid are in any appropriate combination. Also, the three or more light source parts 4 arranged in a triangular grid are in any appropriate combination. For example, each of the six light source parts 4Bd of the light source device 1d is a portion of such an appropriate combination of three or more light source parts 4. A rectangular grid region $6Ad_1$ indicates a region in which the light source parts 4Ad are disposed in a rectangular grid, and triangular grid regions $6Bd_1$, $6Bd_2$, and $6Bd_3$ indicate regions in which the light source parts 4Bd are disposed in a triangular grid.

FIG. 10E illustrates a light source device 1e and at least a portion of the plurality of light source parts provided in a placement region 12e with any appropriate shape in a plan view. The light source device 1e includes 13 light source parts 4Ae disposed in a rectangular grid and four light source parts 4Be disposed in a triangular grid (specifically, four light source parts 4Be corresponding to one of the light source parts 4 disposed in a triangular grid). The term "light source parts 4Ae" refers collectively to the light source parts disposed in a rectangular grid, and the term "light source parts 4Be" refers collectively to the light source parts disposed in a triangular grid. The light source parts 4Ae are illustrated with diagonal hatching, and the light source parts 4Be are illustrated with dot hatching.

Of the 13 light source parts 4Ae, the four or more light source parts 4Ae arranged in a rectangular grid are in any appropriate combination. Also, the three or more light source parts 4 disposed in a triangular grid are in any appropriate combination. For example, each of the four light source parts 4Be of the light source device 1e is a portion of such an appropriate combination of three or more light source parts 4. Rectangular grid regions $6Ae_1$ and $6Ae_2$ indicate regions in which the light source parts 4Ae are disposed in a rectangular grid, and triangular grid regions $6Be_1$, $6Be_2$, and $6Be_3$ indicate regions in which the light source parts 4Be are disposed in a triangular grid. As illustrated in the triangular grid regions $6Be_1$, $6Be_2$, and $6Be_3$, some of light source parts 4 disposed in the rectangular grid regions $6Ae_1$ and $6Ae_2$ may be a portion of the triangular grid pattern. The same applies to the light source devices 1b, 1c, and 1d.

The arrangement of the plurality of light source parts 4 in an embodiment does not need to be a rectangular grid pattern or a triangular grid pattern. However, combination of at least a rectangular grid pattern and a triangular grid pattern allows for reduction in size of the placement region in the light source device. Also, the arrangement of the plurality of light source parts 4 does not need to be symmetrical. That is, the plurality of light source parts 4 can be disposed in a placement region with any appropriate shape in a plan view. Note that in the modified example described above, an example of the arrangement of the light source parts 4 has been given. However, the same applies to the arrangement of the light guiding members in the light guide array unit.

Examples

Subsequently, an example which is a further implementation of the embodiment described above will be described. FIG. 11 is a diagram illustrating a comparison of the light source device 1 according to an example and a light source device 1X according to a reference example. In FIG. 11, the left side column is for the items, the central column is for the light source device 1, and the right side column is for the light source device 1X.

FIG. 11 lists experiment data relating to the maximum illuminance, illuminance uniformity, and illuminance distribution for three light emission patterns of the light source device 1 and lists experiment data relating to the maximum illuminance, illuminance uniformity, and illuminance distribution for the light source device 1X. However, for the experiment data relating to the illuminance uniformity of the light source device 1, only the experiment result for a light emission pattern in which all of the plurality of light source parts provided in the light source device 1 are turned on is listed.

Figure 12:
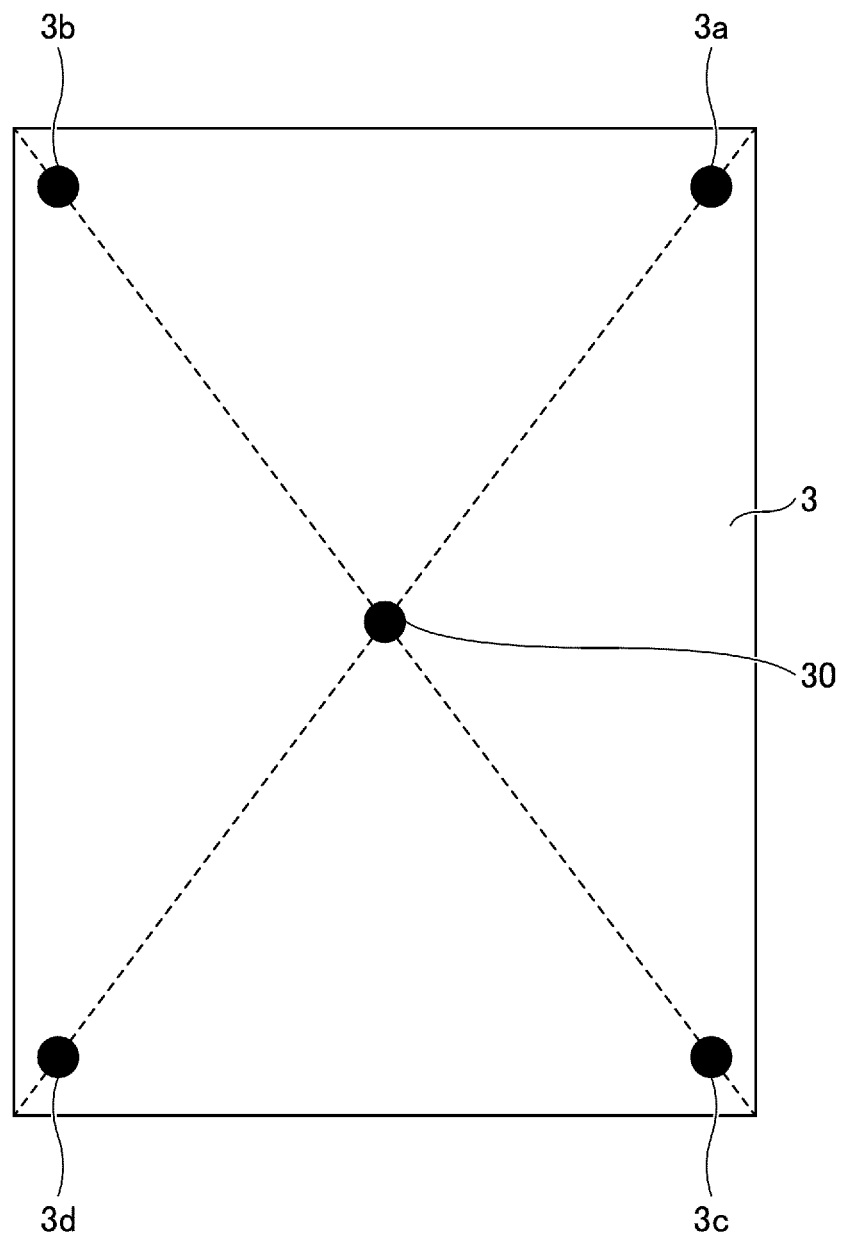
FIG. 12 is a diagram for describing illuminance uniformity.

Note that in the present example, the illuminance uniformity is a value obtained by dividing the minimum illuminance, from among the illuminance levels at the four corner regions of the irradiated region, by the illuminance at a center region of the irradiated region. FIG. 12 is a diagram for explaining the illuminance uniformity that illustrates a center region 30 of the irradiated region 3 and corner regions 3a, 3b, 3c, and 3d corresponding to the regions of the four corners.

In evaluating the illuminance uniformity, light was emitted from a light source device to a diffusion plate provided at a position separated from the light source device by 300 mm and an image of the irradiated region 3 on the diffusion plate was captured via a camera from the opposite side of the diffusion plate from the light source device. In the image captured by the camera, the pixel brightnesses of the image regions corresponding to the center region 30 and the corner regions 3a to 3d of the irradiated region 3 are taken as the illuminance levels of the respective regions. The center region 30 and the corner regions 3a to 3d of the irradiated region 3 are circular regions with a size in terms of diameter of approximately 10 mm. The pixel brightnesses of the image regions corresponding to the center region 30 and the corner regions 3a to 3d of the irradiated region 3 used the average value of the luminance values of a plurality of pixels forming the corresponding image region.

Each of the positions of the corner regions 3a to 3d on the irradiated region 3 is a position corresponding to an angle corresponding to a 90% of irradiation angle of the light source device. Specifically, when the position of the center region 30 is defined as coordinates (0, 0)(mm), the coordinates of the position of the corner region 3a are (126.0, 166.5)(mm), the coordinates of the position of the corner region 3b are (−126.0, 166.5)(mm), the coordinates of the position of the corner region 3c are (126.0, −166.5)(mm), and the coordinates of the position of the corner region 3d are (−126.0, −166.5)(mm).

Returning now to FIG. 11, the description of FIG. 11 will be continued. The light emission pattern represents the positions of the light-emitting light source parts in the light source device 1 and the light source device 1X. Each square in the light emission pattern row of FIG. 11 schematically represents a light source part including a light-emitting element (LED) and a light guiding member. As illustrated in FIG. 11, in the light source device 1, the plurality of light source parts are disposed in a circular pattern, and in the light source device 1X, a single light source part is disposed.

The light source device 1 includes a plurality (63 in this example) of light source parts, and accordingly light can be emitted in a plurality of light emission patterns according to the quantity of light source parts.

In FIG. 11, three of these light emission patterns are illustrated. The light source device 1X includes one light source part, and thus one light emission pattern is illustrated. In addition, in FIG. 11, light-emitting (turned-on) light source parts are indicated by dot hatching, and non-light-emitting (turned-off) light source parts are indicated without hatching.

The illuminance distribution indicates the illuminance distribution of irradiation light obtained at a portion of the irradiated region and corresponds to the irradiation pattern. The illuminance distribution illustrated in FIG. 11 is obtained by using a camera to capture an image of irradiation light on a screen provided at a position separated from the light source device by a predetermined distance, for example.

The main specifications of the light source device 1 and the light source device 1X are as follows. Note that wt % used below represents percentage by weight and is the percentage of the weight of a component to the total weight of the base material resin and the component.

Main Specifications of Light Source Device 1
  Quantity of LEDs: 63 (units)
  External Size of LED (length S in FIG. 5): 520 (μm)
  Light-emitting part Size (length C in FIG. 5): 330 (μm), where a light-emitting element has a
  square shape in plan view with sides of 220 (μm)
  Wavelength λd of Light of Light-emitting Element: 457 (nm)
  Wavelength Conversion Member: $Lu_3Al_5O_{12}$:Ce and $CaAlSiN_3$:Eu-containing silicone resin
  Cover Member: Titanium oxide-containing silicone resin
  Titanium Oxide Content in Cover Member: 60 (wt %)
  Refractive Index of Titanium Oxide of Cover Member: 2.54
  Refractive index of Silicone Resin of Cover Member: 1.51
  Light Diffusion Member above Wavelength Conversion Member: Titanium oxide-containing silicone resin
  Titanium Oxide Content in Light Diffusion Member above Wavelength Conversion Member: 0.93 (wt %)
  Light Guiding Member: TIR lens array including 63 TIR lenses
  Material of Light Guiding Member: Polycarbonate (refractive index of 1.58)
  Size of Light Guiding Member in Plan View (length L in FIG. 2A): 35 (mm)
  Diameter of Placement Region (diameter D in FIG. 2B): 32.4 (mm)
  Height of Light guide array unit (length h in Z-axis direction of FIG. 2B): 2.59 (mm)
Main Specifications of Light Source Device 1X
  Quantity of LEDs: 1 unit
  External Size of LED (size corresponding to length S in FIG. 5): 1720 (μm)
  Light-emitting part Size (size corresponding to length C in FIG. 5): 1484 (μm), where a light-emitting element has a square shape in plan view with sides of 1400 (μm)
  Light Diffusion Member above Wavelength Conversion Member: Titanium oxide and glass filler-containing silicone resin
  Titanium Oxide Content in Light Diffusion Member above Wavelength Conversion Member: 4.17 (wt %)
  Glass Filler Content in Light Diffusion Member above Wavelength Conversion Member: 44.61 (wt %)
  Light Guiding Member: One Fresnel lens in which a top surface is flat and a bottom surface is uneven
  Material of Light Guiding Member: Polycarbonate (refractive index of 1.58)
  Size of Light Guiding Member in Plan View: 6.56×6.56 (mm)
  Fresnel Diameter (diameter) of Light Guiding Member: 5.41 (mm)
  Height of Light Guiding Member (length in Z-axis direction): 1.65 (mm)
  Note that specification items other than those described above for LEDs are the same as for the light source device 1 and the light source device 1X.

As illustrated in FIG. 11, in the case of a light emission pattern in which all 63 light source parts of the light source device 1 emitted light, the maximum illuminance was 2676 (lux) and the uniformity was 41.5(%). In the irradiated region, illuminance distribution in a wide range was obtained due to the irradiation light of all of the light source parts.

In the case of a light emission pattern in which, of the 63 light source parts of the light source device 1, one light source part in the central portion emitted light, the maximum illuminance was 1250 (lux). In the irradiated region, localized illuminance distribution was obtained in only the portion corresponding to the irradiation light from the single light source part in the central portion.

In the case of a light emission pattern in which, of the 63 light source parts of the light source device 1, one light source part in the peripheral portion emitted light, the maximum illuminance was 454 (lux). In the irradiated region, localized illuminance distribution was obtained in only the portion corresponding to the irradiation light from the single light source part in the peripheral portion.

On the other hand, in the case in which one light source part of the light source device 1X emitted light, the maximum illuminance was 1500 (lux) and the uniformity was 41.0(%). In the irradiated region, illuminance distribution in a wide range was obtained due to the irradiation light of the one light source part.

From FIG. 11, it can be seen that the light source device 1 has a maximum illuminance 1.78 times higher than that of the light source device 1X and can obtain irradiation light 1.78 times brighter than that of the light source device 1X. Also, localized irradiation of a portion of the irradiated region as well as irradiation of a wide area of the irradiated region is possible.

FIGS. 13A and 13B are diagrams illustrating an example of the illuminance distribution of irradiation light from the light source device 1. FIG. 13A illustrates the illuminance distribution of irradiation light from the light source device 1, and FIG. 13B illustrates the illuminance distribution of irradiation light from the light source device 1X.

The illuminance distributions illustrated in FIGS. 13A and 13B are the illuminance distribution obtained on a screen when the screen provided at a distance separated by 500 (mm) is irradiated with light from the light source device 1 or the light source device 1X.

As illustrated in FIG. 13B, with the light source device 1X, only one illuminance distribution was obtained from the one light emission pattern. On the other hand, as illustrated in FIG. 13A, with the light source device 1, by changing the light source parts that emit light of the 63 light source parts, seven illuminance distributions were obtained. However, this is not limited to seven, and by selecting the quantity and positions of the light-emitting light source parts from among the 63 light source parts, a corresponding illuminance distribution can be obtained.

As illustrated in FIG. 13A, various illuminance distributions (irradiation patterns) were obtained by changing the light emission pattern in the light source device 1. Accordingly, the illumination position, illumination direction, illumination area, and the like can be freely switched without moving the light source device 1.

Although the preferred embodiments and the like have been described in detail above, the disclosure is not limited to the above-described embodiments and the like, various modifications and substitutions can be made to the above-described embodiments and the like without departing from the scope described in the claims.

For example, in the embodiment described above, a configuration of a light guiding member including a TIR lens is described, but is not limited thereto. For example, a light guiding member can include a light guiding tube, a refractive lens, a diffraction lens, a refractive index distribution lens, or the like.

The light source device of the present invention can irradiate a desired irradiated region with light, and thus can be suitably used for illumination, camera flash, headlights on a vehicle, the backlight of a head-up display, and the like. However, the light source device of the present invention is not limited to these uses.

Reference Character List

1 Light source device
10 Substrate
11 Light guide array unit
111 Emitting surface
12 Placement region
13 Peripheral region
14 Center axis of placement region
2 Irradiation light
20 Drive circuit
3 Irradiated region
31 Partial region
4 Light source part
$4p_1$, $4s$ Light source part (example of first light source part)
$4pc_1$, $4pc_2$, $4qc$, $4sc$, $4tc$, $4uc$, $4vc$ Center of light source part
$4p_2$, $4u$ Light source part (example of second light source part)
$4q$, $4t$ Light source part (example of third light source part)
$4v$ Light source part (example of fourth light source part)
41 TIR lens (example of light guiding member)
410 Center line
411 Total reflection surface
412 Truncated cone surface
42 LED (example of light-emitting element)
43 Optical axis
421 Light-emitting part
422 Periphery of light-emitting part
5 Triangular grid region
100 Smartphone
101 Back surface panel
102 Through hole

What is claimed is:

1. A light source device comprising:
a plurality of light source parts configured to emit light, wherein:
each of the light source parts comprises a light-emitting element and a light guiding member,
the plurality of light source parts are disposed in a circular, planar-shaped placement region, and are arranged in (i) a combination of at least a rectangular grid and a triangular grid or (ii) a concentric circular pattern,
all outermost ones of the light source parts collectively form a shape other than a rectangle, and
the plurality of light source parts are configured such that, when all the light source parts in the placement region emit light, the light source parts emit the light in a matrix pattern having a rectangular outer shape.

2. The light source device according to claim 1, wherein: the plurality of light source parts are configured to individually emit the light.

3. The light source device according to claim 1, wherein: one or some light source parts of the plurality of light source parts have respective optical axes each orientated in an irradiation direction toward an axis orthogonal to a plane of the placement region, and
one or some light source parts of the plurality of light source parts have respective optical axes each orientated in an irradiation direction at a skew position with respect to an axis orthogonal to the plane of the placement region.

4. The light source device according to claim 1, wherein: the light source device is a flashlight or a photography flash.

5. The light source device according to claim 1, wherein: one or more of the plurality of light source parts have respective optical axes each orientated in an irradiation direction toward a center axis of the placement region.

6. The light source device according to claim 1, wherein: of the plurality of light source parts, light source parts disposed in a central portion of the placement region are arranged in a rectangular grid, and
of the plurality of light source parts, one or more light source parts of light source parts disposed in a peripheral portion of the placement region are arranged in a triangular grid.

7. The light source device according to claim 6, wherein: the light source parts disposed in the central portion have respective optical axes each orientated in an irradiation direction toward a center axis of the placement region, and
one or more of the light source parts disposed in the peripheral portion have respective optical axes each orientated in an irradiation direction at a skew position with respect to the center axis of the placement region.

8. The light source device according to claim 1, wherein: the light guiding members included in the plurality of light source parts include a first light guiding member including a total reflection surface that totally reflects the light and a second light guiding member including a total reflection surface that totally reflects the light, and
the first light guiding member and the second light guiding member have different shapes.

9. The light source device according to claim 1, wherein: the plurality of light source parts are connected on a surface side where adjacent light guiding members of the light guiding members emit the light.

10. A light guide array unit comprising:
a plurality of light guiding members, wherein:
each of the plurality of light guiding members is configured to guide light incident from a light-emitting element and cause the guided light to irradiate an irradiated region,
the plurality of light guiding members are disposed in a circular, planar-shaped placement region, and are arranged in (i) a combination of at least a rectangular grid and a triangular grid, or (ii) a concentric circular pattern,
all outermost ones of the light guiding members collectively form a shape other than a rectangle, and
the plurality of light guiding members are configured such that, when all the light guiding members in the placement region guide light, the light guiding members irradiate the light in a matrix pattern having a rectangular outer shape.

11. The light guide array unit according to claim 10, wherein:
one or some of the plurality of light guiding members have respective optical axes each orientated in an irradiation direction toward an axis orthogonal to a plane of the placement region, and
one or some of the plurality of light guiding members have respective optical axes each orientated in an irradiation direction at a skew position with respect to an axis orthogonal to the plane of the placement region.

* * * * *